United States Patent
Wang et al.

(10) Patent No.: US 12,184,369 B2
(45) Date of Patent: Dec. 31, 2024

(54) ADAPTIVE PHASE-CHANGING DEVICE POWER-SAVING OPERATIONS

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 20 days.

(21) Appl. No.: 18/259,768

(22) PCT Filed: Nov. 30, 2021

(86) PCT No.: PCT/US2021/061281
§ 371 (c)(1),
(2) Date: Jun. 28, 2023

(87) PCT Pub. No.: WO2022/150118
PCT Pub. Date: Jul. 14, 2022

(65) Prior Publication Data
US 2024/0063863 A1     Feb. 22, 2024

Related U.S. Application Data

(60) Provisional application No. 63/133,992, filed on Jan. 5, 2021.

(51) Int. Cl.
*H04W 76/28* (2018.01)
*H04B 7/026* (2017.01)
(Continued)

(52) U.S. Cl.
CPC ........... *H04B 7/0617* (2013.01); *H04B 7/026* (2013.01); *H04B 7/04013* (2023.05);
(Continued)

(58) Field of Classification Search
CPC .............. H04B 7/0617; H04B 7/04013; H04B 7/026; H04B 7/0456; H04W 76/28; H04W 52/0235
See application file for complete search history.

(56) References Cited

U.S. PATENT DOCUMENTS

2012/0106423 A1   5/2012   Nylander et al.
2013/0182587 A1   7/2013   Sebeni et al.
(Continued)

FOREIGN PATENT DOCUMENTS

CN     110225538     9/2019
WO     2020028517     2/2020
(Continued)

OTHER PUBLICATIONS

"International Preliminary Report on Patentability", Application No. PCT/US2021/061281, Jul. 4, 2023, 11 pages.
(Continued)

*Primary Examiner* — Janice N Tieu
(74) *Attorney, Agent, or Firm* — Colby Nipper PLLC

(57) ABSTRACT

Techniques and apparatuses are described for adaptive phase-changing device power-saving operations. In aspects, a base station determines to transition an adaptive phase-changing device (APD) into an enabled APD-PS mode and determines an APD-PS configuration for the APD that specifies a framework for operating in the enabled APD-PS mode. The base station then directs the APD to operate in the enabled APD-PS mode by communicating the APD-PS configuration to the APD and transmits or receives wireless signals using a surface of the APD and based on the APD-PS configuration.

20 Claims, 9 Drawing Sheets

(51) Int. Cl.
*H04B 7/04* (2017.01)
*H04B 7/0456* (2017.01)
*H04B 7/06* (2006.01)
*H04W 52/02* (2009.01)

(52) U.S. Cl.
CPC ...... *H04B 7/0456* (2013.01); *H04W 52/0235* (2013.01); *H04W 76/28* (2018.02)

(56) References Cited

U.S. PATENT DOCUMENTS

| | | | |
|---|---|---|---|
| 2014/0198696 | A1 | 7/2014 | Li et al. |
| 2018/0152890 | A1* | 5/2018 | Jia ..................... H04W 52/0203 |
| 2019/0208427 | A1 | 7/2019 | Rofougaran et al. |
| 2020/0112917 | A1 | 4/2020 | Nam et al. |
| 2020/0344691 | A1* | 10/2020 | Liu ..................... H04W 52/028 |
| 2021/0297954 | A1* | 9/2021 | He ..................... H04W 52/0235 |
| 2021/0410107 | A1* | 12/2021 | Park ..................... H04W 68/02 |
| 2024/0019922 | A1* | 1/2024 | Choi ................. H04W 52/0216 |

FOREIGN PATENT DOCUMENTS

| | | |
|---|---|---|
| WO | 2020254030 | 12/2020 |
| WO | 2022150118 | 7/2022 |

OTHER PUBLICATIONS

"International Search Report and Written Opinion", Application No. PCT/US2021/061281, Mar. 11, 2022, 15 pages.

"RIS Configuration, Beamformer Design, and Power Control in Single-Cell and Multi-Cell Wireless Networks", Mar. 20, 2021, 15 pages.

Li, Yu-Ngok Ruyue, et al., "Power Saving Techniques for 5G and Beyond", IEEE Access Jun. 2020, Dec. 2019, 15 pages.

Liu, Yuanwei, et al., "Reconfigurable Intelligent Surfaces: Principles and Opportunities", Jul. 7, 2020, 60 pages.

Wu, Qingqing, et al., "Intelligent Reflecting Surface Enhanced Wireless Network: Joint Active and Passive Beamforming Design", Dec. 9, 2018, 6 pages.

\* cited by examiner

ADAPTIVE PHASE-CHANGING DEVICE POWER-SAVING OPERATIONS

RELATED APPLICATION(S)

This application is a national stage entry of International Application No. PCT/US2021/061281, filed Nov. 30, 2021, which claims the benefit of U.S. Provisional Application No. 63/133,992, filed Jan. 5, 2021, the disclosures of which are incorporated herein by reference in their entireties.

BACKGROUND

Evolving wireless communication systems, such as fifth generation (5G) technologies and sixth generation (6G) technologies, use various techniques that increase data capacity relative to preceding wireless networks. As one example, 5G technologies transmit data using higher frequency ranges, such as the above-6 Gigahertz (GHz) band. As another example, the 5G technologies support multiple-input, multiple-output (MIMO) communications that use multiple transmission and/or reception paths.

While the higher frequency ranges for these evolving wireless communication systems can be used to increase data capacity, transmitting and recovering information using these higher frequency ranges also poses challenges. The higher-frequency signals and MIMO transmissions, for instance, are more susceptible to multipath fading and other types of path loss, which lead to recovery errors at a receiver. High-frequency data transmissions may also use higher power-consumption relative to low-frequency transmissions. It therefore becomes desirable to correct for the signal distortions and employ power-saving techniques in order to obtain sustainable performance benefits (e.g., increased data capacity) provided by these approaches.

SUMMARY

This document describes techniques and apparatuses for adaptive phase-changing device power-saving (ADP-PS) operations. In aspects, a base station determines to transition an adaptive phase-changing device (APD) into an enabled APD-PS mode and determines an APD-PS configuration for the APD that specifies a framework for operating in the enabled APD-PS mode. The base station then directs the APD to operate in the enabled APD-PS mode by communicating the APD-PS configuration to the APD and transmits or receives wireless signals using a surface of the APD and based on the APD-PS configuration.

In aspects, an APD receives, from a base station, an indication of an APD-PS configuration that specifies a framework for operating in an enabled APD-PS mode. In response to receiving the APD-PS configuration, the APD operates in the enabled APD-PS mode by performing at least one APD-PS state transition specified by the APD-PS configuration.

The details of one or more implementations for adaptive phase-changing device power-saving operations are set forth in the accompanying drawings and the following description. Other features and advantages will be apparent from the description, the drawings, and the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects for adaptive phase-changing device power-saving operations are described with reference to the following drawings. The same numbers are used throughout the drawings to reference like features and components.

DETAILED DESCRIPTION

Figure 1:
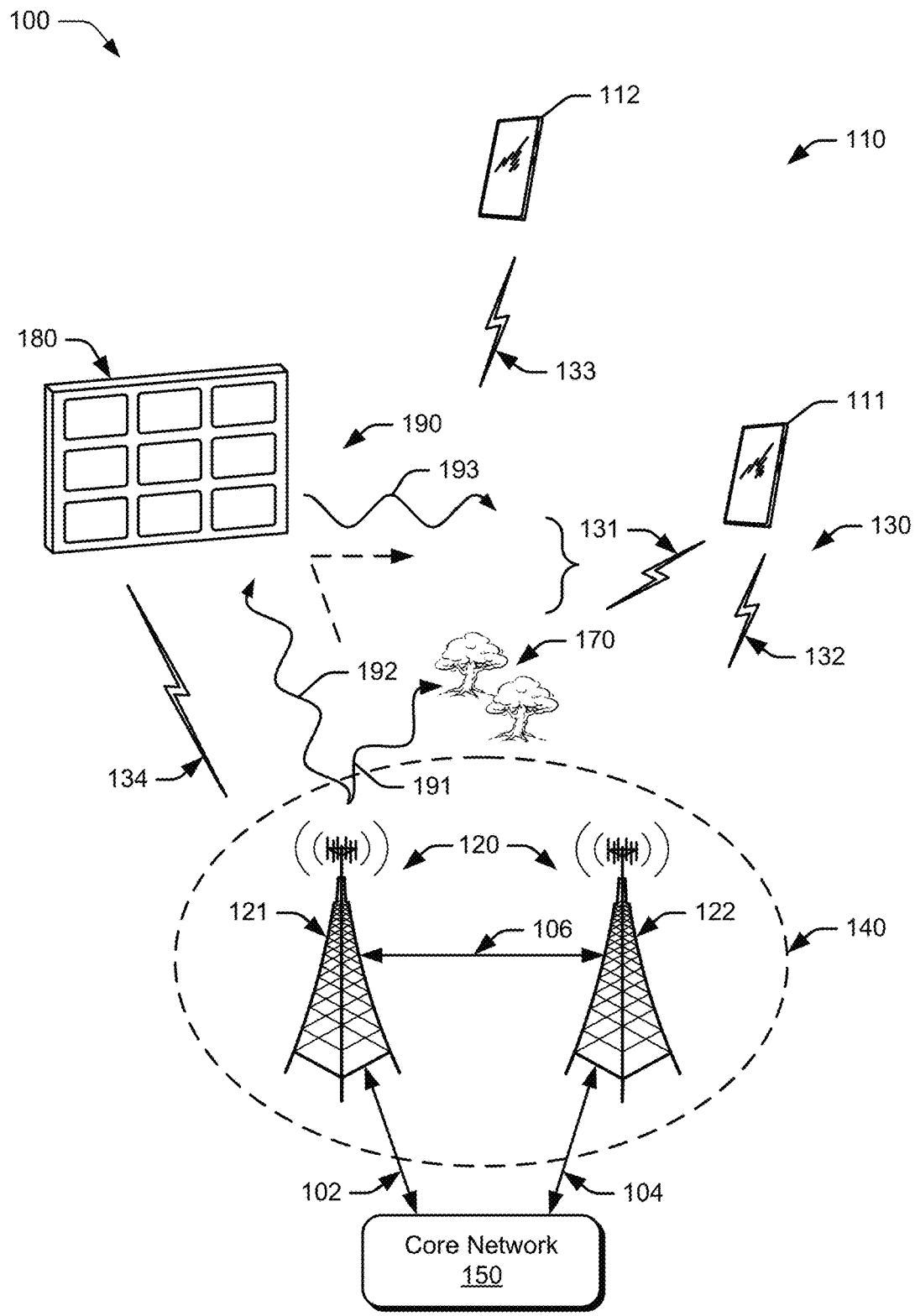
FIG. 1 illustrates an example operating environment in which various aspects of adaptive phase-changing device power-saving operations can be implemented.

Evolving wireless communication systems use various techniques to meet usage demands that strain or exceed the capabilities of preceding wireless communication systems. To illustrate, next-generation user devices implement applications that consume larger quantities of user data relative to preceding applications. To deliver these larger quantities of user data, evolving wireless communication systems (e.g., 5G, 6G) transmit at higher frequencies (e.g., millimeter wave (mmWave) range), sometimes with MIMO, to increase data capacity. While higher frequencies and MIMO communications provide higher data throughput, channel conditions can negatively impact these techniques. As an example, mmWave signals have high throughput under Line of Sight (LoS) conditions, but reflections create multipath and frequency-selective fading that may increase recovery errors at the receiver.

Adaptive phase-changing devices (APDs) include a Reconfigurable Intelligent Surface (RIS) that, when properly configured, modifies propagating signals to correct for, or reduce, errors introduced by communication path(s), such as small-scale fading and fading MIMO channels. Generally, an RIS includes configurable surface materials that shape how incident signals striking with the surface of the materials are transformed. To illustrate, the configuration of the surface materials can affect the phase, amplitude, and/or polarization of the transformed signal. Thus, modifying a surface configuration of the RIS changes how signals are transformed when they reflect off the RIS.

An APD continuously operating in an on-state (e.g., continuously monitoring a control channel for commands, continuously powering the RIS) may, however, needlessly consume power resources. To illustrate, assume the APD continuously monitors an adaptive phase-changing device control channel (APD-control channel) for surface configuration commands and/or continuously powers the RIS for use. During high communication-traffic periods, such as outdoor events or rush-hour, the power consumption by the APD when operating in the APD on-state enables various devices to utilize the APD surface to improve transmissions in the wireless network. A base station, for instance, may heavily use the APD to communicate with various UEs during the high communication-traffic periods, such as by configuring and reconfiguring the surface of the APD through the APD-control channel for communications with different user equipments (UEs) and/or by transmitting signals towards the RIS. However, during low communication-traffic periods, such as early-morning hours (e.g., 2:00 AM, 3:00 AM), the APD on-state may disproportionately consume power resources relative to APD-usage due to a lack of APD-control channel traffic and/or lack of wireless signals being exchanged in the wireless network.

In aspects, APD-power saving (APD-PS) operations reduce power consumption by an APD by temporarily disabling various functions at the APD during anticipated or known time-periods of inactivity in the wireless network. As one example, a base station directs the APD to operate in a partial APD-PS sleep-state in which the APD temporarily stops monitoring the APD-control channel for messages but powers the RIS to preserve the signal transformation properties of the surface. As another example, the base station directs the APD to operate in a full APD-PS sleep-state in which the APD temporarily stops monitoring the APD-control channel for messages and reduces power to the RIS. By providing APD-PS operations, a wireless network can reduce power consumption by the APD during low-utilization periods and retain the benefits provided by the APD (e.g., improved signal quality) during high-utilization periods.

While features and concepts of the described systems and methods for adaptive phase-changing device power-saving operations can be implemented in any number of different environments, systems, devices, and/or various configurations, various aspects of adaptive phase-changing device power-saving operations are described in the context of the following example devices, systems, and configurations.

Example Environment

FIG. 1 illustrates an example environment 100, which includes multiple user equipment 110 (UE 110), illustrated as UE 111 and UE 112. Each UE can communicate with base stations 120 (illustrated as base stations 121 and 122) through one or more wireless communication links 130 (wireless link 130), illustrated as wireless links 131, 132, and 133. Alternatively or additionally, the wireless links 130 include a wireless link 134 between at least one of the base stations 120 (e.g., base station 121) and an adaptive phase-changing device 180 (APD 180) to control a surface configuration of the APD 180 and/or to configure APD-PS operations of the APD 180. In the environment 100, the base station 121 communicates with the APD 180 using the wireless link 134. In other implementations, the base stations 120 include a wireline interface for communicating APD-control information to the APD 180. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device, such as a sensor, relay, or actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base stations, or the like, or any combination thereof.

One or more base stations 120 communicate with the user equipment 110 using the wireless links 131, 132, and 133, which may be implemented as any suitable type of wireless link. In one example, the base station 121 communicates with the UE 111 using the wireless link 131, the base station 122 communicates with the UE 111 using the wireless link 132, and the base station 121 communicates with the UE 112 using the wireless link 133. The wireless links 131, 132, and 133 include control-plane information and/or user-plane data, such as downlink user-plane data and control-plane information communicated from the base stations 120 to the user equipments 110, uplink of other user-plane data and control-plane information communicated from the user equipments 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), fifth-generation New Radio (5G NR), sixth-generation (6G), and so forth. Multiple wireless links 130 may be aggregated in a carrier aggregation or multi-connectivity technology to provide a higher data rate for the UE 110. Multiple wireless links 130 from multiple base stations 120 may be configured for Coordinated Multipoint (CoMP) communication with the UE 110.

In some implementations, the wireless links (e.g., the wireless links 131, 132, and 133) utilize wireless signals, where an intermediate device (e.g., APD 180) reflects or transforms ray(s) 190 of the wireless signals, illustrated as signal ray 191, signal ray 192, and signal ray 193. In the environment 100, the signal ray 190 corresponds to rays of a wireless signal used to implement the wireless link 131, such as a downlink wireless signal (illustrated in FIG. 1) from the base station 121 to the UE 111 and/or an uplink wireless signal (not illustrated in FIG. 1) from the UE 111 to the base station 121. As part of communicating with the UE 111 through wireless link 131, the base station 121 beams a downlink wireless signal intended for the UE 111. A first ray of the downlink wireless signal (e.g., the signal ray 191) propagates toward the UE 111 in a line-of-sight (LoS) manner, where an obstruction 170 dynamically blocks and/or attenuates the LoS signal ray 191. A second ray of the downlink wireless signal (e.g., the signal ray 192) propagates toward the APD 180. The signal ray 192 strikes the surface of the APD 180 and transforms into signal ray 193 that propagates toward the UE 111. The environment 100 illustrates the obstruction 170 as foliage, but any other material may obstruct the LoS signal ray, such as vehicles, human bodies, water vapor, and so forth.

The base station 120 can configure an RIS of the APD 180 to direct how the RIS alters signal properties (e.g., direction, phase, amplitude, polarization) of a wireless signal. Alternatively or additionally, the base station 120 enables and/or disables an APD-PS mode at the APD 180 to control when the APD 180 performs power-saving operations. In aspects, the base station 120 communicates RIS surface-configuration information and/or APD-PS configuration information to the APD 180 using the wireless link 134, which may include an adaptive phase-changing device slow-control channel (APD-slow-control channel) and/or an adaptive phase-changing device fast-control channel (APD-fast-control channel).

In various implementations of adaptive phase-changing device power-saving operations, the base station 120 determines surface configuration(s) for the APD 180 to direct or steer reflections of wireless signals transmitted by the base stations 121 and 122 toward the UEs 111 and 112, including surface configurations used while the APD 180 operates in an enabled APD-PS mode. Alternatively or additionally, the base station 120 determines surface configuration(s) for the APD 180 based on downlink signal-quality measurements/parameters received from the UE 111 and/or the UE 112, uplink-quality measurements/parameters generated by the base station 120, and/or link-quality measurements/parameters obtained from historical data records as further described.

In various implementations of adaptive phase-changing device power-saving operations, the base station 120 selects APD-PS configurations that specify, to the APD 180, a framework for operating in an enabled APD-PS mode. In other words, the base station 120 selects any combination of a power-saving cycle duration, surface configurations, transitions between APD-PS awake-states and APD-PS sleep-states, wakeup signal monitoring cycles, and so forth. For instance, the base station 120 may select, as an APD-PS configuration, a long APD-PS cycle that includes multiple short APD-PS cycles and/or surface configurations for each short APD-PS cycle. In aspects, the base station 120 selects the surface configurations and/or short APD-PS cycles based on the UE 110 (e.g., the UE 111, the UE 112), such as by aligning the short APD-PS cycles to discontinuous reception (DRX) cycles, discontinuous transmission (DTX) cycles, physical random access channel (PRACH) transmission opportunities, and so forth. For example, aligning a short APD-PS cycle may include causing a short APD-PS cycle to begin and/or end at substantially the same time as a DRX cycle, DTX cycle, or PRACH opportunity. Alternatively or additionally, the base station selects the APD-PS configuration based on base station transmissions, such as synchronization signal block (SSB) transmissions and/or integrated access backhaul (IAB) communications between a donor base station and a node base station.

The base stations 120 are collectively a Radio Access Network 140 (e.g., RAN, Evolved Universal Terrestrial Radio Access Network, E-UTRAN, 5G NR RAN or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an S1 interface for control-plane signaling and user-plane data communications when connecting to an Evolved Packet Core (EPC) network. The user equipment 110 may connect, via the core network 150, to public networks such as the Internet, to interact with a remote service (not illustrated in FIG. 1).

The base stations 121 and 122 can communicate using an Xn Application Protocol (XnAP) through an Xn interface or using an X2 Application Protocol (X2AP) through an X2 interface, at 106, to exchange user-plane and control-plane data. Alternatively or additionally, the base stations 121 and 122 communicate with one another using a wireless integrated access backhaul (IAB) link (not illustrated in FIG. 1), where one of the base stations acts as a donor base station and the other base station acts as a node base station. In some aspects, the base stations 121 and 122 include the surface of the APD 180 in a communication path for the IAB link, and (optionally) direct the APD 180 to operate in an enabled APD-PS mode as further described. This can include the donor base station and/or the node base station controlling the APD 180 and/or the APD-PS mode using an APD-control channel as further described.

Example Devices

Figure 2:
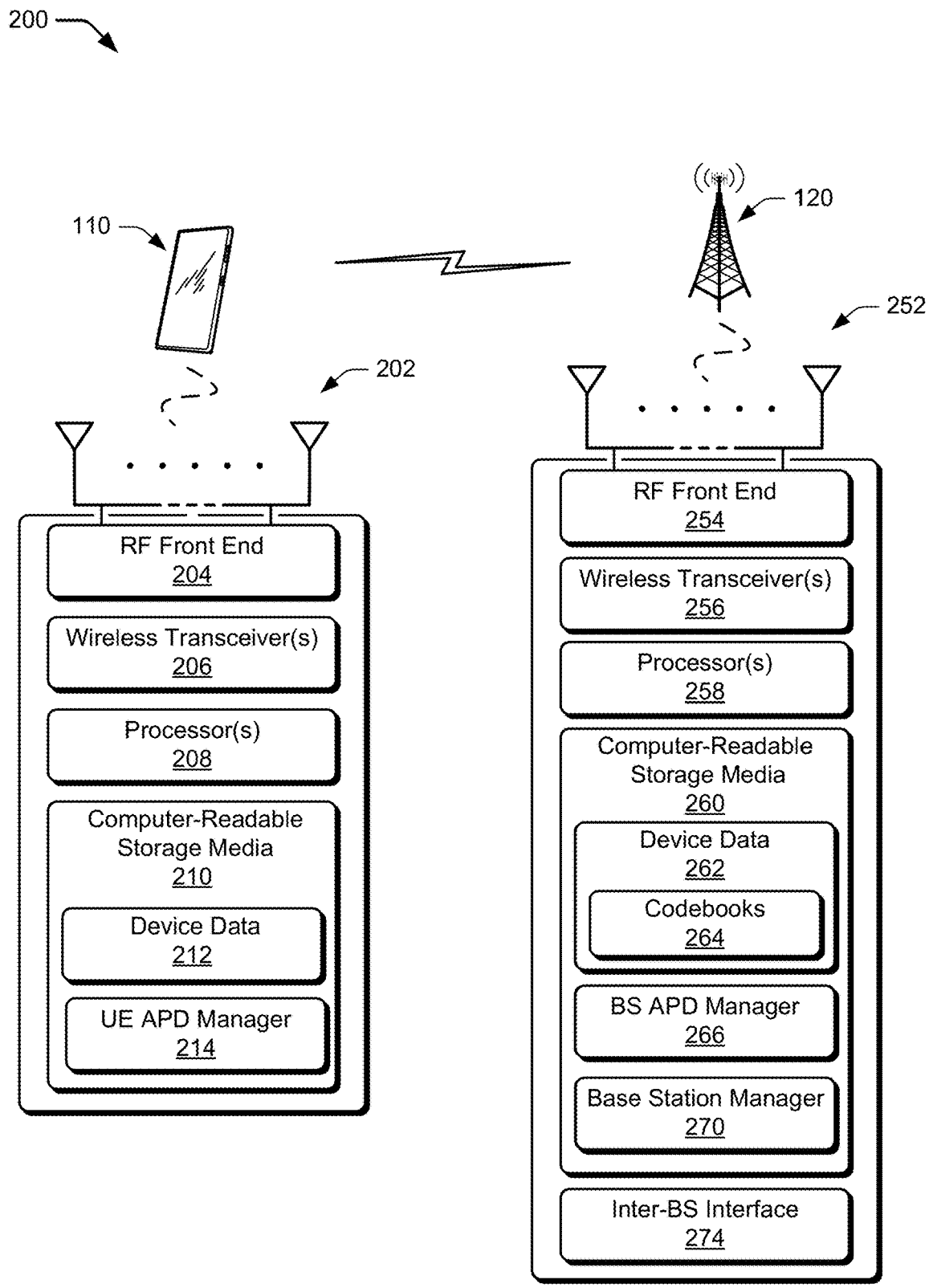
FIG. 2 illustrates an example device diagram of entities that can implement various aspects of adaptive phase-changing device power-saving operations.

FIG. 2 illustrates an example device diagram 200 of the UE 110 and base station 120. Generally, the device diagram 200 describes network entities that can implement various aspects of adaptive phase-changing device power-saving operations. FIG. 2 shows respective instances of the UE 110 and the base station 120. The UE 110 or the base station 120 may include additional functions and interfaces that are omitted from FIG. 2 for the sake of visual brevity. The UE 110 includes antennas 202, a radio-frequency front end 204 (RF front end 204), and one or more wireless transceivers 206 (e.g., radio-frequency transceivers), such as any combination of an LTE transceiver, a 5G NR transceiver, and/or a 6G transceiver for communicating with the base station 120 in the RAN 140. The RF front end 204 of the UE 110 can couple or connect the wireless transceivers 206 to the antennas 202 to facilitate various types of wireless communication.

The antennas 202 of the UE 110 may include an array of multiple antennas that are configured in a manner similar to or different from each other. The antennas 202 and the RF front end 204 can be tuned to, and/or be tunable to, one or more frequency bands defined by communication standards (e.g., 3GPP LTE, 5G NR) and implemented by the wireless transceiver(s) 206. Additionally, the antennas 202, the RF front end 204, and/or the wireless transceiver(s) 206 may be configured to support beam-sweeping for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards (e.g., 57-64 GHz, 28 GHz, 38 GHz, 71 GHz, 81 GHz, or 92 GHz bands).

The UE 110 also includes processor(s) 208 and computer-readable storage media 210 (CRM 210). The processor 208 may be a single-core processor or a multiple-core processor implemented with a homogenous or heterogeneous core structure. The computer-readable storage media described herein excludes propagating signals. CRM 210 may include any suitable memory or storage device such as random-access memory (RAM), static RAM (SRAM), dynamic RAM (DRAM), non-volatile RAM (NVRAM), read-only memory (ROM), or Flash memory useable to store device data 212 of the UE 110. The device data 212 includes any combination of user data, multimedia data, applications, and/or an operating system of the UE 110. In implementations, the device data 212 stores processor-executable instructions that are executable by the processor(s) 208 to enable user-plane communication, control-plane signaling, and user interaction with the UE 110.

The CRM 210 of the UE 110 may optionally include a user equipment adaptive phase-changing device manager 214 (UE APD manager 214). Alternatively or additionally, the UE APD manager 214 may be implemented in whole or part as hardware logic or circuitry integrated with or separate from other components of the UE 110. In aspects, the UE APD manager 214 receives APD-access information for using a surface of an APD, such as reflection-access information that indicates time information on when to use the APD surface and/or configurable surface element information that indicates portions of the APD surface available to the UE 110. The UE APD manager 214 directs the UE 110 to transmit communications with the base station 120 by using a surface of the APD and based on the APD-access information.

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The base station 120 includes antennas 252, a radio-frequency front end 254 (RF front end 254), one or more wireless transceiver(s) 256 (e.g., radio-frequency transceivers) for communicating with the UE 110 and/or another base station 120, such as LTE transceivers, 5G NR transceivers, and/or 6G transceivers. The RF front end 254 of the base station 120 can couple or connect the wireless transceivers 256 to the antennas 252 to facilitate various types of wireless communication. The antennas 252 of the base station 120 may include an array of multiple antennas that are configured in a similar manner or different from each other. The antennas 252 and the RF front end 254 can be tuned to, and/or be tunable to, one or more frequency bands defined by communication standards (e.g., 3GPP LTE, 5G NR) and implemented by the wireless transceivers 256. Additionally, the antennas 252, the RF front end 254, and/or the wireless transceivers 256 may be configured to support beamforming, such as Massive-MIMO, for the transmission and reception of communications with the UE 110 and/or another base station 120.

The base station 120 also includes processor(s) 258 and computer-readable storage media 260 (CRM 260). The processor 258 may be a single-core processor or a multiple-core processor composed of a variety of materials, such as silicon, polysilicon, high-K dielectric, copper, and so on. CRM 260 may include any suitable memory or storage device such as RAM, SRAM, DRAM, NVRAM, ROM, or Flash memory useable to store device data 262 of the base stations 120. The device data 262 includes network-scheduling data, radio resource-management data, applications, and/or an operating system of the base station 120, which are executable by processor(s) 258 to enable communication with the UE 110. The device data 262 also includes codebooks 264. The codebooks 264 may include any suitable type or combination of codebooks, including surface-configuration codebooks that store surface-configuration information for a RIS of an APD and beam-sweeping codebooks that store patterns, sequences, or timing information for implementing multiple surface-configurations useful to direct an APD to perform a variety of reflective beamforming. In some aspects, the surface-configuration codebooks and beam-sweeping codebooks include phase-vector information, angular information (e.g., calibrated to respective phase vectors), and/or beam-configuration information.

In aspects, the CRM 260 of the base station 120 also includes a base station-adaptive phase-changing device manager 266 (BS APD manager 266) for managing APD usage in communication path(s) with the UE 110. Alternatively or additionally, the BS APD manager 266 may be implemented in whole or part as hardware logic or circuitry integrated with or separate from other components of the base station 120. In aspects, the BS APD manager 266 identifies APDs near the UE 110 and determines when to utilize the APD(s) in the communication path. The BS APD manager 266 also determines surface configurations for the APD (e.g., RIS configurations), such as initial surface configurations and/or surface reconfigurations based on link-quality measurements, measurement reports, and/or other values as further described. In some implementations, the BS APD manager 266 selects an APD-PS configuration that specifies a framework for operating in an enabled APD-PS mode, such as any combination of APD PS awake-states and/or APD PS sleep-states. To illustrate, the APD-PS configuration specifies an APD-PS cycle that designates, to an APD, when to operate in an APD-PS awake-state, when to operate in a partial APD-PS sleep-state (e.g., temporarily stop monitoring the APD-control channel for messages but continue powering the RIS), and/or when to operate in a full APD-PS sleep-state (e.g., temporarily stop monitoring the APD-control channel for messages and temporarily stop powering the RIS). Depending on RIS technology, the non-powered RIS may maintain the current surface configuration that controls how incident signals transform when striking the surface or the RIS surface configuration may "blank" when non-powered. Alternatively or additionally, the APD-PS configuration specifies one or more surface configurations and/or when to apply the surface configurations. The BS APD manager 266 may also determine when to enable and/or disable an APD-PS mode for the APD 180.

The CRM 260 also includes a base station manager 270 for managing various functionalities and communication interfaces of the base stations 120. Alternatively or additionally, the base station manager 270 may be implemented in whole or in part as hardware logic or circuitry integrated with or separate from other components of the base stations 120. In at least some aspects, the base station manager 270 configures the antennas 252, RF front end 254, and wireless transceivers 256 for communication with the UE 110 (e.g., the wireless link 131, the wireless link 132, the wireless link 133), and/or the APD 180 (e.g., the wireless link 134). The base station 120 sometimes includes a core network interface (not shown) that the base station manager 270 configures to exchange user-plane data and control-plane information with core network functions and/or entities.

Figure 3:
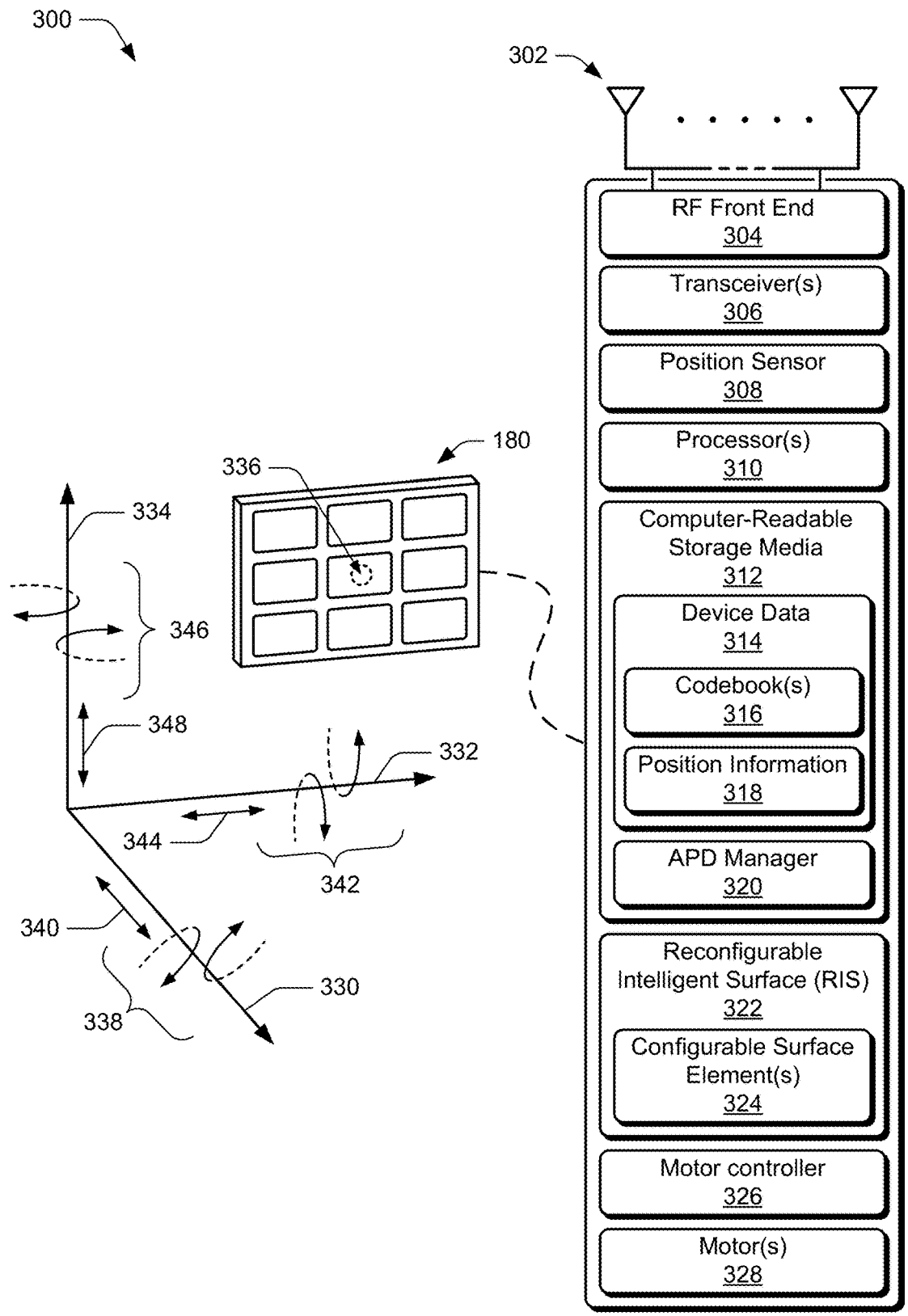
FIG. 3 illustrates an example device diagram of an adaptive phase-changing device that can be used in accordance with one or more aspects of adaptive phase-changing device power-saving operations.

FIG. 3 illustrates an example device diagram 300 of the APD 180. Generally, the device diagram 300 describes an example entity with which various aspects of adaptive phase-changing device power-saving operations can be implemented but may include additional functions and interfaces that are omitted from FIG. 3 for the sake of visual clarity. The adaptive phase-changing device (APD) 180 is an apparatus that includes a Reconfigurable Intelligent Surface (RIS) 322, and components for controlling the RIS 322 (e.g., by modifying the surface configuration of the RIS), as further described below. In some implementations, the APD 180 may also include components for modifying the position of the APD 180 itself, which in turn modifies the position of the RIS 322. The APD 180 includes one or more antenna(s) 302, a radio frequency front end 304 (RF front end 304), and one or more radio-frequency transceivers 306 for wirelessly communicating with the base station 120 and/or the UE 110. The APD 180 can also include a position sensor, such as a GNSS module, that provides position information based on a location of the APD 180.

The antenna(s) 302 of the APD 180 may include an array of multiple antennas that are configured in a manner similar to or different from each other. Additionally, the antennas 302, the RF front end 304, and the transceiver(s) 306 may be configured to support beamforming for the transmission and reception of communications with the base stations 120. By way of example and not limitation, the antennas 302 and the RF front end 304 can be implemented for operation in sub-gigahertz bands, sub-6 GHz bands, and/or above 6 GHz bands. Thus, the antenna 302, the RF front end 304, and the transceiver(s) 306 provide the APD 180 with an ability to receive and/or transmit communications with the base station 120, such as information transmitted using APD-control channels (e.g., an APD-slow-control channel, APD-fast-control channel) as further described.

The APD 180 includes processor(s) 310 and computer-readable storage media 312 (CRM 312). The processor 310 may be a single-core processor or a multiple-core processor implemented with a homogenous or heterogeneous core-structure. The computer-readable storage media described herein excludes propagating signals. CRM 312 may include any suitable memory or storage device such as RAM, SRAM, DRAM, NVRAM, ROM, or Flash memory useable to store device data 314 of the APD 180. The device data 314 includes user data, multimedia data, applications, and/or an operating system of the APD 180, which are executable by processor(s) 310 to enable dynamic configuration of the APD 180 as further described. The device data 314 also includes one or more codebooks 316 of any suitable type or combination, and position information 318 of the APD 180. The position information 318 may be obtained or configured using the position sensor 308 or programmed into the APD 180, such as during installation. The position information 318 indicates a position of the APD 180 and may include a location, geographic coordinates, orientation, elevation information, or the like. A base station 120, by way of a BS APD manager 266, can use the position information 318 in computing angular or distance information, such as between the base station 120 and APD 180 and/or between the APD 180 and a UE 110 of interest. The codebooks 316 can include surface-configuration codebooks that store surface-configuration information for a RIS of an APD and beam-sweeping codebooks that store patterns, sequences, or timing information (e.g., phase vectors and reflection identifiers) for implementing multiple surface-configurations useful to direct an APD to perform a variety of reflective beamforming. In some aspects, the surface-configuration codebooks and beam-sweeping codebooks include phase-vector information, angular information (e.g., calibrated to respective phase vectors), and/or beam-configuration information.

In aspects of adaptive phase-changing device power-saving operations, the CRM 312 of the APD 180 includes an adaptive phase-changing device manager 320 (APD manager 320). Alternatively or additionally, the APD manager 320 may be implemented in whole or part as hardware logic or circuitry integrated with or separate from other components of the APD 180. Generally, the APD manager 320 manages a surface configuration of the APD 180, such as by processing information exchanged with a base station over wireless link(s) 133 and/or 134 and using the information to configure a reconfigurable intelligent surface 322 (RIS 322) of the APD 180. To illustrate, the APD manager 320 receives an indication of a surface configuration over the wireless links 133 (an APD control channel), extracts the surface configuration from the codebooks 316 using the indication, and applies the surface configuration to the RIS 322. Alternatively or additionally, the APD manager 320 initiates the transmission of uplink messages to the base station over the wireless links 133, such as acknowledgments/negative acknowledgments (ACKs/NACKs) for various APD configuration or management commands. In some aspects, the APD manager 320 receives an indication of a beam-sweeping pattern (e.g., beam-sweeping pattern index) over the wireless links 133 and applies a sequence of various surface configurations to the RIS based on the beam-sweeping pattern and/or in accordance with a synchronization or pattern timing indicated by or received with the indication.

In aspects, the APD manager 320 implements APD-PS operations, such as by enabling and/or disabling an APD-PS mode based on directions from the base station 120, transitioning the APD 180 between APD-PS states (e.g., a partial APD-PS sleep-state, a full APD-PS sleep-state, an APD-PS awake-state), applying surface configurations when operating in an enabled APD-PS mode based on APD-PS configuration information, and so forth. In aspects, the APD manager 320 monitors for an APD-wakeup signal when operating in an enabled APD-PS mode and/or monitors for an APD-sleep signal when operating in a disabled APD-PS mode.

The APD manager 320 may coordinate APD-PS configuration information from multiple base stations, such as APD-PS configuration information from a donor base station and a node base station that communicate with one another over an IAB link. To illustrate, assume a donor base station and a node base station share access to an APD-control channel, and each base station directs the APD 180 (by way of the APD manager 320) to operate using a respective APD-PS configuration. In aspects, the APD manager 320 waits for synchronized and/or aligned APD-PS configuration information before transitioning into an enabled APD-PS mode. In other words, the APD manager 320 enables the APD-PS mode and transitions to APD-PS awake-states and APD-PS sleep-states when the donor base station and the node base station communicate synchronized information.

The RIS 322 of the APD 180 includes one or more configurable surface element(s) 324, such as configurable electromagnetic elements, configurable resonator elements, or configurable reflectarray antenna elements. Generally, the configurable surface elements 324 can be selectively or programmatically configured to control how the RIS 322 reflects (e.g., directionality) and/or transforms incident waveforms. By way of example and not of limitation, configurable electromagnetic elements include scattering particles that are connected electronically (e.g., through PIN diodes). Implementations use the electronic connection to arrange the scattering particles, such as based on principles of reflection, to control a directionality, phase, amplitude, and/or polarization of the transformed waveform (from the incident waveform). The RIS 322 can include array(s) of configurable surface element(s) 324, where an array can include any number of elements having any size.

In some aspects, a position and/or orientation of the APD 180 is configurable, and the APD 180 includes a motor controller 326 communicating with one or more motor(s) 328 that are operably coupled with a physical chassis of the APD 180. Based on command and control information, such as received from a base station 120, the motor controller 326 can send commands to the motors 328 that alter one or more kinematic behaviors of the motors 328, which may include any suitable type of stepper motor or servo. For example, the motor controller 326 may issue commands or control signals that specify a shaft rotation of a stepper motor in degrees, a shaft-rotation rate of a stepper motor in revolutions per minute (RPM), a linear movement of a linear motor millimeters (mm), a linear velocity of a linear motor in meters/second (m/s). The one or more motors 328, in turn, may be linked to mechanisms that mechanically position the physical chassis or a platform (e.g., avionics of a drone, a drive of a linear rail system, a gimble within a base station, a linear bearing within a base station) supporting the APD 180. Through the commands and signals that the motor controller 326 generates and sends to the motors 328, a physical position, location, or orientation of the APD 180 (and/or the platform supporting the APD 180) may be altered. In response to receiving a position configuration from a base station, the APD manager 320 communicates movement commands to the motor controller 326, such as through a software interface and/or hardware addresses, based on the position configuration. In aspects of adaptive phase-changing device power-saving operations, a base station 120 may reposition or reorient one or more APDs 180 to improve or enable wireless signal reflections to be directed to the UE 110.

Generally, the APD 180 can include multiple motors, where each motor corresponds to a different rotational or linear direction of movement. Examples of motor(s) 328 that can be used to control orientation and location of the APD include linear servo motors that might be part of a (i) rail system mounting for the APD, (ii) motors controlling a direction and pitch, yaw, roll of a drone carrying the APD, (iii) radial servo or stepper motors that rotate an axis if the APD is in a fixed position or on a gimbal, and so on. For clarity, the motor controller 326 and the motors 328 are illustrated as being a part of the APD 180, but in alternative or additional implementations, the APD 180 communicates with motor controllers and/or motors external to the APD. To illustrate, the APD manager 320 communicates a position configuration to a motor controller that mechanically positions a platform or chassis that supports the APD 180. In aspects, the APD manager 320 communicates the position configuration to the motor controller using a local wireless link, such as Bluetooth®, Zigbee™, IEEE 802.15.4, or a hardwire link. The motor controller then adjusts the platform based on the position configuration using one or more motors. The platform can correspond to, or be attached to, any suitable mechanism that supports rotational and/or linear adjustments, such as a drone, a rail-propulsion system, a hydraulic lift system, and so forth.

As shown in FIG. 3, a position of the APD 180 may be defined with respect to a three-dimensional coordinate system in which an X-axis 330, Y-axis 332, and Z-axis 334 define a spatial area and provide a framework for indicating a position configuration through rotational and/or linear adjustments. While these axes are generally labeled as the X-axis, Y-axis, and Z-axis, other frameworks can be utilized to indicate the position configuration. To illustrate, aeronautical frameworks reference the axes as vertical (yaw), lateral (pitch), and longitudinal (roll) axes, while other movement frameworks reference the axes as vertical, sagittal, and frontal axes. As one example, position 336 generally points to a center position of the APD 180 that corresponds to a baseline position (e.g., position (0,0,0) using XYZ coordinates).

In aspects, the APD manager 320 communicates a rotational adjustment (e.g., rotational adjustments 338) around the X-axis 330 to the motor controller 326, where the rotational adjustment includes a rotational direction (e.g., clockwise or counterclockwise), an amount of rotation (e.g., degrees), and/or a rotation velocity. Alternatively or additionally, the APD manager 320 communicates a linear adjustment 340 along the X-axis, where the linear adjustment includes any combination of a direction, a velocity, and/or a distance of the adjustment. At times, the APD manager 320 communicates adjustments around the other axes as well, such as any combination of rotational adjustments 342 around the Y-axis 332, linear adjustments 344 along the Y-axis 332, rotational adjustments 346 around the Z-axis 334, and/or linear adjustments 348 along the Z-axis 334. Thus, the position configuration can include combinations of rotational and/or linear adjustments in all three degrees of spatial freedom. This allows the APD manager 320 to communicate physical adjustments to the APD 180. Alternatively or additionally, the APD manager communicates RIS surface configurations as further described.

Controlling Adaptive Phase-Changing Devices

Figure 4:
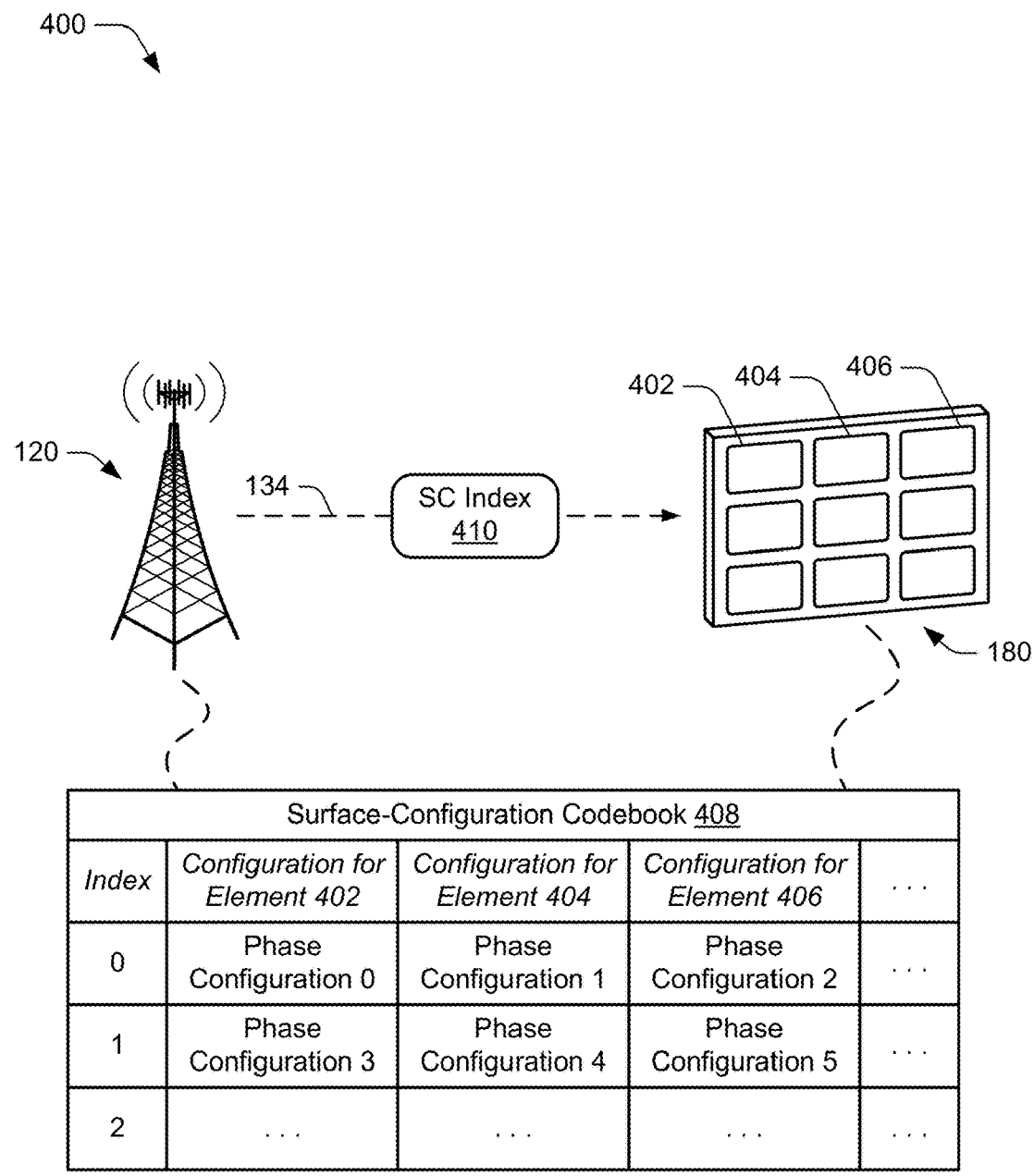
FIG. 4 illustrates an example environment in which a base station configures an adaptive phase-changing device in accordance with various aspects of adaptive phase-changing device power-saving operations.

FIG. 4 illustrates an example 400 of configuring an APD 180 in accordance with one or more aspects of adaptive phase-changing device power-saving operations. The example 400 includes instances of abase station 120 and an APD 180, which may be implemented similarly as described with reference to FIGS. 1-3. The RIS implemented by the APD 180 includes an array of "N" configurable surface elements, such as configurable surface element 402, configurable surface element 404, configurable surface element 406, and so forth, where "N" represents the number of configurable surface elements of the RIS.

In some aspects of adaptive phase-changing device power-saving operations, a base station 120 configures the configurable surface elements of the RIS (e.g., configurable surface elements 402, 404, and 406) to direct how incident waveforms transform. For example, and with reference to FIG. 1, the base station 120 analyzes link-quality measurements, measurement reports, and/or other values (e.g., downlink-quality measurements, uplink-quality measurements, historical link-quality measurements) to identify channel impairments that affect a wireless link (e.g., wireless link 131, wireless link 132, wireless link 133) with a UE. By way of example and not of limitation, various link-quality measurements that do not meet an acceptable performance level can indicate channel impairments, such as by a delay spread between a first received signal and a last received signal (e.g., received multipath rays) exceeding an acceptable delay spread threshold or by an average time-delay (of the multipath rays) exceeding an acceptable average time-delay threshold. Alternatively or additionally, the link-quality measurements can be used to obtain an estimated UE-location, which the base station 120 then uses to access historical data records. The base station 120 may determine, from the historical data records, that the estimated UE-location corresponds to a location with a history of channel impairment(s). In response to identifying the channel impairments, the base station 120 selects a surface configuration for an RIS that transforms wireless signals (used to implement a wireless link) to mitigate the channel impairments by improving a received signal quality.

In implementations, the base station 120 manages a configuration of the RIS of the APD 180 through use of a surface-configuration codebook 408, which can be preconfigured and/or known by both the base station 120 and the APD 180. As one example, the base station 120 analyzes the codebook to identify a surface configuration that modifies and/or transforms various signal characteristics of a wireless signal, such as modifying one or more desired phase characteristic(s), one or more amplitude characteristic(s), a polarization characteristic, and so forth. In some implementations, the base station 120 uses historical data records to select a surface configuration. For instance, the base station uses an estimated UE-location to retrieve surface configurations from historical data records that link locations to surface configurations that improve signal quality at the location.

In some cases, the base station 120 transmits a surface-configuration codebook 408 and/or a beam-sweeping codebook using the wireless link 134, such as over an APD-slow-control channel using one or more messages. In aspects, the base station 120 uses the APD-slow-control channel to communicate large quantities of data, to communicate data without low-latency requirements, and/or to communicate data without timing requirements. At times, the base station 120 transmits multiple surface-configuration codebooks to the APD 180, such as a first surface-configuration codebook for downlink communications, a second surface-configuration codebook for uplink communications, a phase-vector codebook, a beam-sweeping codebook, or the like. In response, the APD 180 stores the surface-configuration codebook(s) 408 and/or other codebooks in CRM, which is representative of codebook(s) 316 in CRM 312 as described with reference to FIG. 3. Alternatively or additionally, the APD 180 obtains the surface-configuration and other codebooks through manufacturing (e.g., programming), calibration, or installation processes that store the surface-configuration codebook(s) 408 and other codebooks in the CRM 312 of the APD 180 during assembly, installation, calibration, verification, or through an operator manually adding or updating the codebook(s).

The surface-configuration codebook 408 includes configuration information that specifies a surface configuration for some or all of the configurable surface elements (e.g., elements 324) forming the RIS of the APD 180. To illustrate, in some aspects, a phase vector defines a set of waveform transformation properties (e.g., phase delay, reflection angle/direction, polarization, amplitude) that a configurable surface element applies to an incident signal (e.g., incident waveform, incident signal ray) to transform the incident signal into a reflected signal (e.g., reflected waveform, reflected signal ray) characterized by one or more transformed properties. With respect to the surface-configuration codebook 408, each configuration entry may correspond to a phase vector or surface configuration associated with a set of waveform transformation properties provided by a respective configurable surface element of an APD when configured with the phase vector or surface configuration.

A surface configuration may include (or indicate) a surface element hardware configuration (e.g., for one or more PIN diodes) for each configurable surface element of the APD. In aspects, each surface element hardware configuration of a surface configuration may correspond to a respective entry in a phase vector. In other words, each surface element hardware configuration arranges the surface of a respective configurable surface element such that the respective configurable surface element transforms an incident waveform into a reflected waveform with waveform properties indicated by the corresponding phase vector entry. This can include absolute transformations based on the phase vector (e.g., generate a reflected waveform to within a threshold value/standard deviation of waveform properties indicated by the phase vector) or relative transformations (e.g., generate a reflected waveform based on modifying the incident waveform with the waveform properties indicated by the phase vector) to within a threshold value/standard deviation of the waveform properties. As one example, each index of the codebook corresponds to a phase vector and configuration information for each configurable surface element of the APD 180. Index 0, for instance, maps phase configuration 0 to configurable surface element 402, phase configuration 1 to configurable surface element 404, phase configuration 2 to configurable surface element 406, and so forth. Similarly, index 1 maps phase configuration 3 to configurable surface element 402, phase configuration 4 to configurable surface element 404, phase configuration 5 to configurable surface element 406, and so forth. The surface-configuration codebook 408 can include any number of phase vectors that specify configurations for any number of configurable surface elements such that a first phase vector corresponds to a first surface configuration for the APD 180 (by way of configurations for each configurable surface element in the RIS), a second phase vector corresponds to a second surface configuration for the APD 180, etc.

While the surface-configuration codebook 408 of FIG. 4 includes phase vector information, alternative or additional codebooks store beam configuration information, such as a first surface configuration that specifies a first beam with a first (propagation) direction, a second surface configuration that specifies a second beam with a second direction, etc. To illustrate, and similar to a phase vector surface configuration codebook, a beam cookbook includes surface element hardware configurations that correspond to a respective beam configuration. In other words, each surface element hardware configuration arranges the surface of a respective configurable surface element such that the respective configurable surface element transforms an incident waveform into a reflected waveform with beam properties (e.g., direction) indicated in the beam-codebook. Thus, in various implementations, the surface-configuration codebook 408 corresponds to a beam-codebook. Similarly, to configure the surface of the APD 180, the base station determines the desired beam configuration for the transformed signal and identifies an entry in the beam-codebook corresponding to the desired beam configuration (e.g., by identifying a beam-codebook index that maps to the entry). In some aspects, a phase-sweeping codebook indicates a pattern of surface configurations and/or beam configurations, such as surface configurations and/or beam configurations as indicated by the surface-configuration codebook 408 and beam configurations specified by the beam-codebook. To illustrate, the phase-sweeping codebook indicates an order of surface configurations to cycle through. Alternatively, or additionally, the phase-sweeping codebook indicates a time duration for applying each surface configuration.

The surface-configuration information stored in a codebook can correspond to a full configuration that specifies an exact configuration (e.g., configure with this value) or a delta configuration that specifies a relative configuration (e.g., modify a current state by this value). In one or more implementations, the phase configuration information specifies a directional increment and/or angular adjustment between an incident signal and a transformed signal. For instance, the phase configuration 0 can specify an angular adjustment configuration for element 402 such that the configurable surface element 402 reflects the incident waveform with a "phase configuration 0" relative angular or directional shift.

As shown in FIG. 4, the base station 120 communicates an indication to the APD 180 that specifies a surface configuration. In the present example, the indication specifies a surface configuration index 410 (SC index 410) that maps to a corresponding surface configuration of the APD 180. In response to receiving the indication, the APD manager 320 retrieves the surface configuration from the surface-configuration codebook 408 using the index and applies the surface configuration to the RIS. For example, the APD manager 320 configures each configurable surface element as specified by a respective entry in the surface-configuration codebook 408.

In various implementations, the base station 120 communicates timing information (not shown) to the APD 180, which may be included with a surface configuration. For instance, the base station 120 sometimes indicates, to the APD 180 and using the wireless link 134, a start time for the application of an indicated surface configuration or beam-sweeping pattern and/or a stop time that indicates when to remove and/or change the surface configuration. This can include communicating the timing information and/or surface configuration in an APD-PS configuration. In changing the surface configuration, the APD 180, by way of the APD manager 320, can apply a default surface configuration, return to a previous surface configuration (e.g., a surface configuration used prior to the indicated surface configuration), and/or apply a new surface configuration to control a direction in which the APD 180 reflects wireless signals. To maintain synchronized timing with the base station 120, the APD 180 receives and/or processes a base station synchronizing signal.

By specifying the timing information, the base station 120 can synchronize and/or configure the APD 180 to a particular UE (e.g., UE 110). For example, the base station 120 configures the APD 180 for the particular UE by specifying start and stop times that correspond to a time slot assigned to the particular UE. Alternatively or additionally, the base station 120 selects an APD-PS configuration that aligns APD-PS sleep-states and APD awake-states with one or more discontinuous reception (DRX) cycles of one or more UEs, synchronization signal block (SSB) transmissions, integrated access backhaul (IAB) communications, and/or physical random access channel (PRACH) transmission opportunities.

In aspects, the base station 120 transmits surface-configuration indications and/or timing information using an APD-fast-control channel, which allows the base station 120 to dynamically configure the APD 180 on a slot-by-slot basis. For example, the base station 120 transmits a surface-configuration schedule to the APD that indicates when to apply different surface configurations to the RIS/configurable surface elements. Alternatively or additionally, the base station 120 communicates surface configuration changes on a slot-by-slot basis using signaling on the APD fast-control channel. These allow the base station to configure the APD for multiple UEs, such as in scenarios where at least two base stations share the APD to communicate with different UEs, and improve data rates, spectral efficiency, data throughput, and reliability for the multiple UEs and the corresponding wireless network.

Adaptive Phase-Changing Device Power-Saving Operations

Transmitting devices can use a surface of an APD to direct or steer wireless signals toward receiving devices to improve received signal quality, such as by redirecting signals around obstructions that otherwise block the transmission. An APD that supports reflecting, directing, and/or steering wireless signals consumes power, such as by monitoring a wireless APD-control channel for surface configuration information and applying power to an RIS to control surface properties. During high-utilization periods (e.g., large quantities of wireless-communication traffic), the benefits of using the APD outweigh the power consumption because the APD helps improve signal quality of the signal transmissions, which improves data extraction at a receiver. However, during low-utilization periods (e.g., little-to-no wireless-communication traffic), the APD power-consumption becomes disadvantageous and wasteful from lack of use. In aspects of adaptive-phase changing device power-saving operations, an APD may operate in an enabled APD-PS mode that causes the APD to consume less power by transitioning between APD-PS awake-states and APD-PS sleep-states during low-utilization periods without negatively impacting wireless-communication transmissions.

Figure 5:
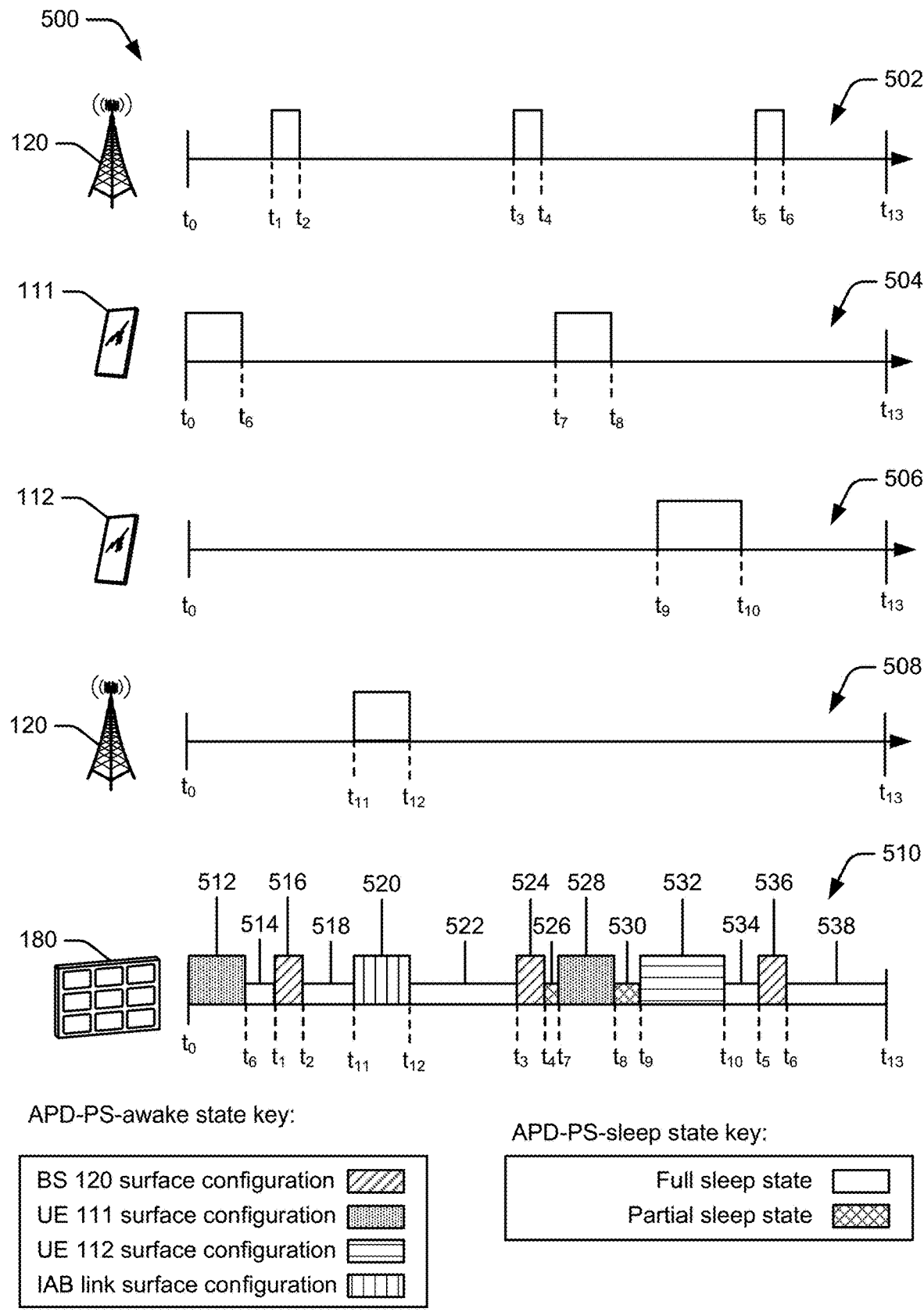
FIG. 5 illustrates an example in accordance with various aspects of adaptive phase-changing device power-saving operations.

FIG. 5 illustrates an example 500 that describes various aspects of adaptive phase-changing device power-saving operations. The example 500 includes a first transmission sequence 502 associated with the base station 120 of FIG. 1, a second transmission sequence 504 associated with the UE 111 of FIG. 1, a third transmission sequence 506 associated with the UE 112 of FIG. 1, and a fourth transmission sequence 508 associated with expected IAB communications with the base station 120, where each transmission sequence describes expected (bursted) wireless transmissions, such as discontinuous transmission (DTX), scheduled IoT data transfer, scheduled IAB communications, PRACH transmission opportunities, and so forth. The transmission sequences 502, 504, 506, and 508 each span a same time-duration of arbitrary length that starts at $t_0$ and ends at $t_{13}$. The illustrated transmission sequences and time-duration are for discussion purposes and are not intended to limit the scope of the claimed subject matter.

In aspects, a base station 120 selects and/or determines an APD-PS configuration based upon expected transmissions in the wireless network. For instance, assume that the base station 120 determines that the wireless network currently operates in a low-utilization mode, such as by identifying that a number of transmissions in the network falls below a threshold value, by determining to transition connected UEs to an enabled DRX mode, and/or by identifying, from historical records, that the wireless network statistically operates in a low-utilization mode during a current time-period. In response to identifying the low-utilization mode, the base station 120 determines to direct an APD 180 to operate in an enabled APD-PS mode. Alternatively or additionally, the base station 120 selects and/or determines an APD-PS configuration that specifies any combination of APD-PS awake-states, APD-PS sleep-states, and/or surface configurations for an RIS. To enable the APD-PS mode, the base station 120 may transmit an APD-PS sleep signal, such as that described with reference to FIG. 7. This can include the base station 120 indicating a wakeup-monitoring period and/or an APD-PS configuration with the APD-PS sleep signal as further described.

To illustrate, assume the transmission sequence 502 corresponds to synchronization signal block (SSB) transmissions from the base station 120 over the time-duration defined by $t_0$ and $t_{13}$ (e.g., a first SSB occurs at time $t_1$ and ends at $t_2$, a second SSB occurs at $t_3$ and ends at $t_4$, a third SSB occurs at $t_5$ and ends at $t_6$). Because the base station 120 controls when the SSB transmissions occur, the base station 120 selects an APD-PS configuration that directs the APD 180 to transition to an APD-PS awake-state during the expected SSB transmissions and to transition to an APD-PS sleep-state otherwise. This can include the base station 120 selecting an APD-PS configuration that directs the APD to transition to the APD-PS awake-state ahead of the expected SSB transmissions such that the APD 180 applies an SSB-related surface configuration to the RIS at the time of, or prior to, the expected SSB transmissions.

As another example, the transmission sequence 504 corresponds to expected downlink transmissions to (and/or uplink transmissions from) the UE 111. To illustrate, assume the UE 111 operates in a discontinuous reception (DRX) mode to reduce UE power-consumption. Based on an associated DRX cycle, the UE 111 wakes up periodically to monitor for downlink transmissions (e.g., at time-duration $t_0$-$t_6$, at time-duration $t_7$-$t_8$). In aspects, the base station 120 determines the DRX cycle for the UE 111. Accordingly, the base station 120 may alternatively or additionally select an APD-PS configuration that transitions the APD 180 to an APD-PS awake-state during the UE 111 awake periods and/or a second surface-configuration that configures the RIS of the APD 180 to reflect the downlink transmissions from the base station 120 to the UE 111. To illustrate, the base station 120 uses signal- and/or link-quality measurements from prior transmissions with the UE 111 to determine the second surface-configuration in a manner similar to that described with reference to FIG. 4.

The transmission sequence 506 corresponds to a PRACH transmission opportunity in the wireless network, which occurs over the time-duration defined by $t_0$ and $t_{13}$ (e.g., a PRACH transmission opportunity occurs at $t_9$ and ends at $t_{10}$). To illustrate, assume the UE 112 uses the PRACH transmission opportunity to transmit an uplink communication to the base station 120. Because the base station 120 knows when the PRACH transmission opportunities exist in the wireless network, the base station 120 select an APD-PS configuration that transitions the APD 180 to an APD-PS awake-state during and/or ahead of the PRACH transmission opportunities. Alternatively or additionally, the base station 120 determines a third surface-configuration that configures the RIS to receive incident signals from a variety of directions and redirect the incident signals towards the base station 120.

The transmission sequence 508 corresponds to (wireless) IAB link transmission opportunities between a donor base station and a node base station that occur over the time-duration defined by $t_0$ and $t_{13}$ (e.g., an JAB link transmission opportunity occurs at $t_{11}$ and ends at $t_{12}$). To illustrate, the base station 120 corresponds to the donor base station that schedules the JAB link transmission opportunities, or a node base station served by the donor base station, where the donor base station and/or the node base station transmit/receive JAB link communications during the JAB link transmission opportunities. In aspects, the donor base station and the node base station use the surface of the APD 180 over the time-duration defined by $t_{11}$ and ends at $t_{12}$ to exchange the wireless signals associated with the (wireless) JAB link.

APD-PS configuration 510 illustrates an example APD-PS configuration determined by the base station 120 and based on a combination of the transmission sequences 502, 504, 506, and 508. A base station may transmit an APD-PS configuration indication (or series of indications) to the APD-PS over the APD fast-control channel prior to time $t_0$ to instruct this APD-PS configuration 510 for the time window between $t_0$ and $t_{13}$ For visual brevity, the APD-PS state transitions defined by the APD-PS configuration (e.g., an APD-PS awake-state, a partial APD-PS sleep-state, a full APD-PS sleep-state) occur at the same times indicated by the transmission sequences 502, 504, 506, and 508, but the APD-PS configuration may alternately or additionally define APD-PS state transitions that occur ahead of, or prior to, expected transmissions, such as a time-duration that allows the APD to apply surface configuration(s) to the RIS and have the RIS settle to a stable state by the start of expected transmission time(s). Also, for simplicity, propagation delay is assumed to be negligible. In situations where propagation delay compensation is desired, the APD-PS may implement techniques such as timing advance. The APD-PS configuration 510 represents an example APD-PS configuration, and other configurations can include more-complex sequences (e.g., more APD-PS state-transitions with more surface configurations) or less-complex sequences (e.g., a single state-transition pair with a single surface-configuration, a single state-transition pair with multiple surface-configurations). To illustrate, the base station 120 can select an APD-PS configuration that aligns APD-PS cycles to UE-DRX cycles, an APD-PS configuration that only directs the APD to monitor for a wakeup signal by indicating a wakeup-monitoring period (and no surface configuration), and/or an APD-PS configuration with a single APD-PS state-transition pair (e.g., one transition to an APD-PS awake-state, one transition to an APD-PS sleep-state) that applies an APD-surface-configuration sequence (e.g., multiple surface-configurations in succession) during the APD-PS awake-state.

Block 512 of the APD-PS configuration 510 directs the APD 180 to transition to an APD-PS awake-state and apply a first surface-configuration associated with the UE 111 (e.g., based on a DRX cycle, based on signal- and/or link-quality parameters) to the RIS. The block 512 directs the APD 180 to continue applying the first surface-configuration to the RIS until $t_6$. In some aspects, while operating in the APD-PS awake-state, the APD 180 receives an APD-PS sleep signal (not illustrated in FIG. 5) and immediately begins transitioning to an APD-PS sleep-state, such as in a manner similar to that described with reference to FIG. 7.

Block 514 of the APD-PS configuration 510 directs the APD 180 to transition to a full APD-PS sleep-state. When operating in the full APD-PS sleep-state, the APD 180 ceases monitoring an APD-control channel for APD-control information and ceases powering the RIS. In some aspects, while operating in the full APD-PS sleep-state, the APD 180 periodically monitors for a wakeup signal (not illustrated in FIG. 5), such as that described with reference to FIG. 8. The block 514 directs the APD 180 to remain in the full APD-PS sleep-state until $t_1$.

Block 516 of the APD-PS configuration 510 directs the APD 180 to transition to an APD-PS awake-state and apply a second surface-configuration to the RIS, where the second surface-configuration corresponds to SSB transmissions from the base station. The block 516 directs the APD 180 to continue applying the second surface-configuration to the RIS until $t_2$.

In some aspects, the APD-PS configuration 510 directs the APD to apply a sequence of surface configurations. To illustrate, in the environment 500, the block 512 corresponds to the APD operating in APD-PS awake-state and applying a first surface-configuration over a first time-duration: $t_0$ to $t_6$. Similarly, the block 516 corresponds to the APD operating in an APD-PS awake-state and applying a second surface-configuration over a second time-duration: $t_1$ to $t_2$. Because the first time-duration and the second time-duration are not adjacent, the APD-PS configuration 510 includes the block 514 that directs the APD to temporarily transition to the full APD-PS sleep-state during a third time-duration that adjoins the first and second time-durations: $t_6$ to $t_1$. In some aspects, instead of directing the APD to temporarily transition to the full APD-PS sleep-state (e.g., block 514), the APD-PS configuration 510 indicates a single time-duration ($t_0$ to $t_2$) and assigns multiple surface-configurations (e.g., the first and second surface-configurations) to the single time-duration. In response to this alternative APD-PS configuration, the APD 180 remains in the APD-PS awake-state over the single time-duration and applies an APD-surface-configuration sequence (e.g., multiple surface-configurations in succession) to the APD-surface, such as by applying the first surface-configuration to the RIS over the span $t_0$ to $t_6$ and then applying the second surface-configuration to the RIS over the span $t_6$ to $t_2$.

Block 518 of the APD-PS configuration 510 directs the APD 180 to transition to a full APD-PS sleep-state. Block 520 of the APD-PS configuration 510 directs the APD 180 to transition to an APD-PS awake-state and apply a third surface configuration to the RIS, where the third surface-configuration configures the RIS for IAB link communications between a donor base station and a node base station. Block 522 of the APD-PS configuration 510 directs the APD 180 to transition back to a full APD-PS sleep-state.

Block 524 of the APD-PS configuration 510 directs the APD 180 to transition to an APD-PS awake-state and (re)apply the second surface-configuration associated with SSB transmissions from the base station 120. Block 526 directs the APD 180 to transition to a partial APD-PS sleep-state. While operating in the partial APD-PS sleep-state, the APD 180 ceases monitoring the APD-control channel and/or a wireline interface for APD-control information but continues to power the RIS and apply a surface configuration to the RIS. For instance, the APD 180 may apply a default surface configuration and/or retain a current surface configuration (e.g., the second surface-configuration applied during $t_3$ to $t_4$). In some aspects, while operating in the partial APD-PS sleep-state, the APD 180 periodically monitors for a wakeup signal as further described.

Block 528 of the APD-PS configuration 510 directs the APD to transition to an APD-PS awake-state and apply the first surface-configuration associated with the UE 111. Block 530 of the APD-PS configuration 510 directs the APD 180 to transition to a partial APD-PS sleep-state.

Block 532 of the APD-PS configuration 510 directs the APD 180 to transition to an APD-PS awake-state and apply a fourth surface-configuration associated with PRACH transmission opportunities. Block 534 of the APD-PS configuration 510 directs the APD 180 to transition to a full APD-PS sleep-state. Block 536 of the APD-PS configuration 510 directs the APD 180 to transition to an APD-PS awake-state and apply the second surface-configuration associated with SSB transmissions. Block 538 of the APD-PS configuration 510 directs the APD 180 to transition to a full APD-PS sleep-state.

The APD-PS configuration 510 corresponds to an APD-PS cycle such that the APD 180 iteratively repeats the APD-PS state transitions and/or applies the surface configurations associated with each state transition as indicated in the APD-PS configuration 510. To illustrate, upon reaching $t_{13}$ (e.g., completing block 538), the APD 180 iteratively returns to the start of the APD-PS cycle $t_0$ to governed by block 512 by transitioning to an APD-PS awake-state and applying the first surface-configuration. In aspects, an APD-PS cycle, such as the one illustrated by the APD-PS configuration 510, corresponds to a long APD-PS cycle that spans a first time-duration that includes multiple short APD-PS cycles, where each short APD-PS cycle spans a respective time-duration that is shorter than the first-time duration. The respective short APD-PS cycles included in the long APD-PS cycle can span a same time-duration as one another or span time-durations that vary from one another. Generally, a short APD-PS cycle corresponds to an APD-PS cycle that includes a single APD-PS state-transition pair (e.g., a APD-PS cycle that defines one APD-PS sleep-state and one APD-PS awake-state), and a long APD-PS cycle corresponds to an APD-PS cycle that includes multiple short APD-PS cycles. As further described, the APD-PS configuration 510 can direct an APD to apply a single surface-configuration or to apply multiple surface-configurations during either a short or long APD-PS cycle.

Signaling and Control Transactions for APD Power-Saving Operations

Figure 6:
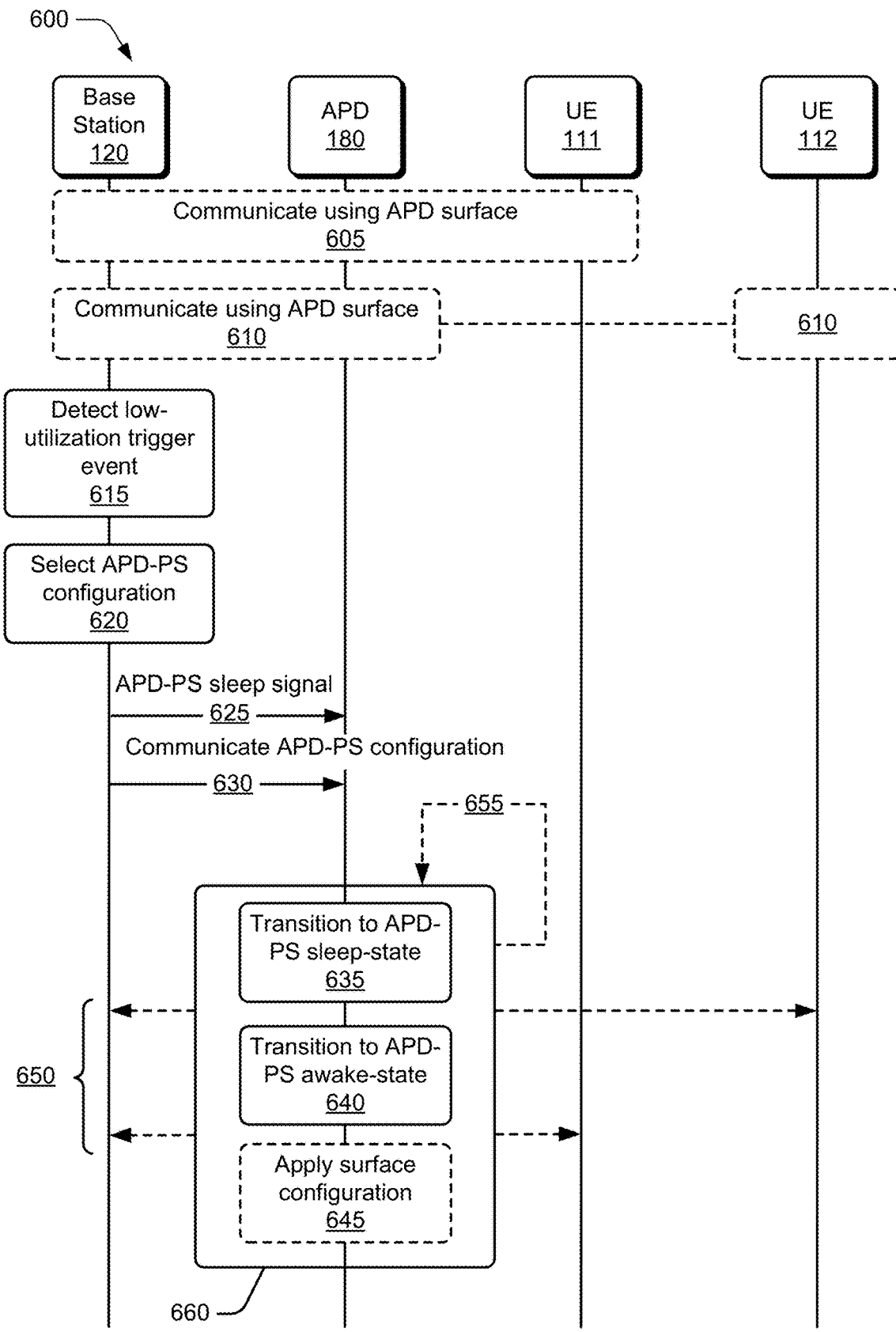
FIG. 6 illustrates an example transaction diagram between various network entities in accordance with various aspects of adaptive phase-changing device power-saving operations.
Figure 7:
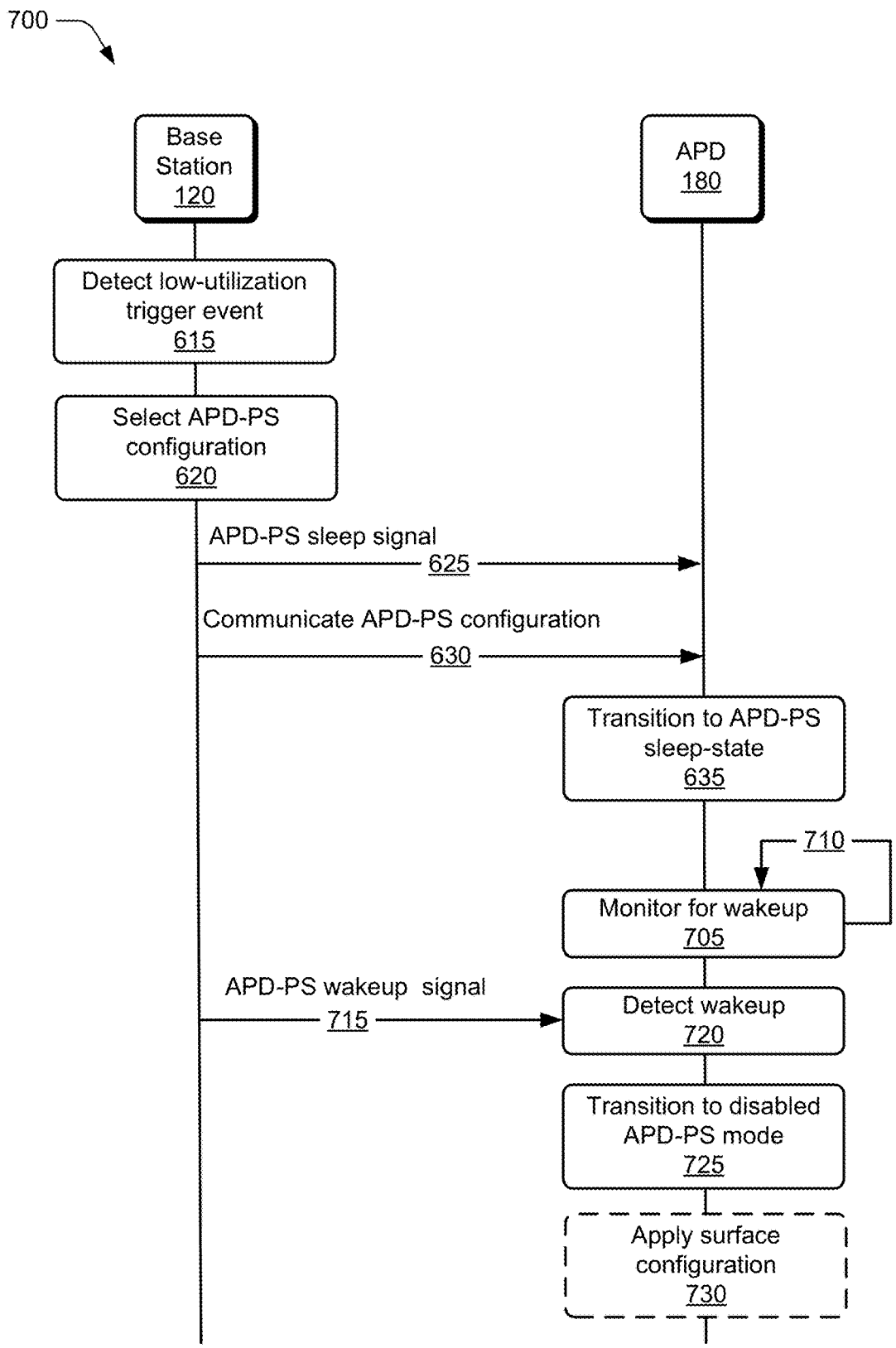
FIG. 7 illustrates an example transaction diagram between various network entities in accordance with various aspects of adaptive phase-changing device power-saving operations.

FIGS. 6 and 7 illustrate example signaling and control transaction diagrams in accordance with one or more aspects of APD power-saving operations. In aspects, the signaling and control transactions may be performed by any combination of devices, including at least a base station (e.g., the base station 120) and an APD (e.g., the APD 180). Alternatively or additionally, the combination of devices may include one or more UEs (e.g., UE 111, UE 112). The example signaling and control transactions may be implemented using aspects as described with reference to any of FIGS. 1-5.

FIG. 6 illustrates a first example of signaling and control transactions for APD power-saving operations. A signaling and control transaction diagram 600 includes signaling and control transactions among the base station 120, the APD 180, and (optionally) the UEs 111 and UE 112 of FIG. 1.

At 605, the base station 120 optionally communicates with the UE 111 using a surface of the APD 180. Similarly, at 610, the base station 120 optionally communicates with the UE 112 using the APD-surface. To illustrate, the base station 120 establishes a connection with the UE 111 and/or the UE 112, such as through a radio resource control (RRC) connection setup procedure, a Non-Access Stratum (NAS) authentication and security procedure, an RRC Reconfiguration procedure, and so forth. In some aspects, the base station 120 determines to include the APD-surface in a communication path with the respective UE. For instance, the base station identifies a channel impairment, determines a respective surface configuration of the APD, configures the APD-surface, and communicates with the respective UE by transmitting wireless signals to (and/or receiving wireless signals from) the APD-surface as described with reference to FIG. 4. At times, as part of communicating with the UEs, the base station 120 directs the UE 111 and/or the UE 112 to transition into an (enabled) DRX mode and indicates a respective DRX cycle (e.g., DRX active periods, DRX inactive periods) to the UE 111 and/or the UE 112. In aspects, the base station 120 uses the established connection(s) with the UE(s) to determine an APD-surface configuration and/or APD-PS state-transitions, such as that described with reference to FIG. 5.

At 615, the base station 120 detects a low-utilization trigger event. For instance, the base station 120 detects that a number of transmissions in the network falls below a first threshold value, identifies that the devices connected to the base station currently operate in a DRX mode, detects that a number of connected UEs falls below a second threshold, and/or determines, from historical records, that the wireless network statistically operates in a low-utilization mode during a current time-period.

At 620, the base station 120 selects an APD-PS configuration. As one example, the base station 120 identifies, from the communications at 605 and/or at 610, that the UEs 111 and/or 112 operate in DRX modes, and that the base station 120 utilizes an APD-surface to communicate with the UEs. Accordingly, at 620, the base station 120 may select the APD-PS configuration based on the respective DRX cycles and/or surface configuration(s) associated with the UEs 111 and/or 112. Alternatively or additionally, the base station 120 selects the APD-PS configuration based on PRACH transmission opportunities and/or SSB transmissions as described with reference to FIG. 5. In some aspects, the base station 120 configures the APD-PS configuration to include transitions to full APD-PS sleep-states and/or partial APD-PS sleep-states. At times, the base station 120 may select an APD-PS configuration that only directs the APD 180 to monitor for a wakeup signal (without applying a surface configuration).

At 625, the base station 120 transmits an APD-PS sleep signal to the APD 180 that directs the APD 180 to transition into an APD-PS sleep-state and/or to transition into an enabled APD-PS mode. In some aspects, the base station 120 transmits a simple APD-PS sleep signal, such as symbol signaling (e.g., a transmission over a particular time interval associated with transmitting a symbol in a wireless network), such as an OFDM symbol in a particular a resource block and/or at a particular symbol within the resource block, and the APD 180 monitors for a presence of the signal in the resource block. Alternatively or additionally, the base station 120 transmits APD-control information using the APD-control channel that directs the APD 180 to transition to the APD-PS sleep-state and/or the enabled APD-PS mode.

At 630, the base station 120 communicates the APD-PS configuration to the APD 180. To illustrate, the base station 120 uses an APD-control channel to transmit the APD-PS configuration. This can include transmitting one or more indexes that map to entries in surface-configuration codebooks and/or transmitting timing information that indicates when to transition to one or more APD-PS states. However, in some aspects, such as when the base station 120 directs the APD 180 to transition into the APD-PS sleep-state and only monitor for the wakeup signal, the base station 120 does not communicate an additional APD-PS configuration to the APD 180. Accordingly, the base station 120 can explicitly indicate the APD-PS configuration by explicitly specifying any combination of APD-PS state transitions or implicitly indicates the APD-PS configuration. To illustrate, the base station 120 may implicitly indicate to transition the APD-PS sleep-state and only monitor for a wakeup signal by not transmitting additional information with the APD-PS sleep signal.

In aspects, the base station 120 combines transactions described at 625 and 630 into a single transaction. As one example, the base station communicates, with the APD-PS sleep signal, a time-duration (e.g., wakeup-monitoring period) that directs the APD 180 to periodically monitor for a wakeup signal as described with reference to FIG. 7. Alternatively or additionally, the base station communicates, with the APD-PS sleep signal, a surface configuration and directs the APD 180 to apply the surface configuration when operating in an APD-PS awake-state.

At 635, and based on the APD-PS configuration, the APD 180 transitions to an APD-PS sleep-state, such as a full APD-PS sleep-state or a partial APD-PS sleep-state as described with reference to FIG. 5. At 640, and based on the APD-PS configuration, the APD 180 transitions to an APD-PS awake-state. In some aspects, while operating in the APD-PS awake-state, the APD 180 decodes information received on the APD-control channel. As one example, the base station 120 transmits, while the APD 180 operates in the APD-PS awake-state, an updated surface configuration and directs the APD to apply the updated surface configuration. Because the APD 180 decodes information received on the APD-control channel while operating in the APD-PS awake-state, the APD 180 receives the updated surface configuration and applies the updated surface configuration to the RIS. Alternatively or additionally, the APD 180 updates the APD-PS configuration based on the updated surface configuration, such as by updating the surface configuration for a current APD-PS awake cycle in the APD-PS configuration. In some aspects, the APD 180 monitors for a wakeup signal (not illustrated in FIG. 6) as described with reference to FIG. 7.

At 645, the APD 180 optionally applies one or more surface configurations to an RIS of the APD 180. In some aspects, the APD 180 applies a sequence of surface configurations to the RIS, such as multiple surface-configurations while operating in a first APD-PS awake-state, applying a different surface configuration for different APD-PS awake-states, and so forth.

At 650, and during any combination of the transactions described at 635, 640, and/or 645, the UE 111 and/or the UE 112 optionally communicate with the base station 120 using the APD surface. As one example, and as described with reference to FIG. 5, the APD 180 transitions to a partial APD-PS sleep-state at 635 and continues to apply a surface configuration associated with UE 111 communications to the RIS, and the base station 120 transmits a downlink communication to the UE 111 during a DRX active-cycle of the UE 111. As another example, the APD 180 transitions to the APD-PS awake-state at 640, applies a surface configuration associated with PRACH transmission opportunities, and the UE 112 transmits a PRACH communication. In some aspects, the APD 180 applies a surface configuration associated with IAB link communications between a donor base station and a node base station.

At 655, the APD 180 optionally and iteratively performs the combination of transactions and operations described at 635, at 640, and 645 as denoted by the sub-diagram 660. To illustrate, the APD 180 transitions between various APD-PS awake-states and/or APD-PS sleep-states associated with an APD-PS cycle, such as the APD-PS cycle defined by the APD-PS configuration 510 of FIG. 5. Alternatively or additionally, the APD 180 monitors for a wakeup signal (not illustrated in the sub-diagram 660) as described with reference to FIG. 7. In a similar manner, the base station 120, the UE 111, and/or the UE 112 may optionally and iteratively communicate using the APD surface as described at 650.

FIG. 7 illustrates a second example of signaling and control transactions for APD power-saving operations. The signaling and control transaction diagram 700 includes signaling and control transactions between the base station 120 and the APD 180 of FIG. 1. In aspects, the diagram 700 may include additional transactions with one or more UEs, such as those described at 650 of FIG. 6, which are not illustrated in FIG. 7 for visual clarity. The example signaling and control transactions may be implemented using aspects as described with reference to any of FIGS. 1-6.

The diagram 700 begins at 615, where the base station 120 detects a low-utilization trigger event and, at 620, selects an APD-PS configuration as described with reference to FIG. 6. To illustrate, the base station 120 may select an APD-PS configuration based on expected SSB transmissions. Alternatively or additionally, the base station 120 selects an APD-PS configuration that directs the APD 180 to transition to an APD-PS sleep-state and only monitor for a wakeup signal (e.g., an APD-PS configuration that does not indicate a surface configuration). However, the base station 120 may select a more complex APD-PS configuration, such as the APD-PS configuration 510 of FIG. 5.

At 625, and in a similar manner as described with reference to FIG. 6, the base station 120 transmits an APD-PS sleep signal to the APD 180 and, at 630, communicates an APD-PS configuration to the APD 180. As described with reference to FIG. 6, the base station may combine these transactions into a single transaction, such as by indicating a wakeup-monitoring period and/or a surface configuration to the APD 180 with the APD-PS sleep signal. Alternatively or additionally, the base station 120 may explicitly indicate an APD-PS configuration or implicitly indicate an APD-PS configuration.

At 635, and in a similar manner as described with reference to FIG. 6, the APD 180 transitions into an APD-PS sleep-state and/or transitions to an enabled APD-PS mode. In some aspects, such as when the APD 180 receives the APD-PS sleep signal while currently operating in the enabled APD-PS mode, the APD 180 remains in the enabled APD-PS mode and replaces the APD-PS configuration with an updated surface configuration received with the APD-PS sleep signal. For instance, assume the APD 180 operates in the enabled APD-PS mode using the APD-PS configuration 510 of FIG. 5. In response to receiving an APD-PS sleep signal that indicates a wakeup-monitoring period and no surface configuration, the APD 180 begins monitoring for a wakeup signal based on the wakeup-monitoring period and ceases using the APD-PS configuration 510.

Accordingly, at 705, the APD monitors for a wakeup signal. In aspects, the APD 180 intermittently monitors for the wakeup signal, such as at intervals defined by the wakeup-monitoring period. In aspects, the APD 180 monitors for the wakeup signal without decoding information from an APD-control channel. As one example, the APD 180 monitors for a presence of a signal (e.g., the APD-PS wakeup signal) at a particular frequency and/or time partition defined by a communication network, such as by monitoring a resource block for symbol signaling. By using a simplified signaling mechanism (relative to APD-control channel decoding), the APD 180 can monitor for the APD-PS wakeup signal without transitioning out of the APD-PS sleep-state. This also allows the APD 180 to monitor for the APD-PS wakeup signal intermittently and use simple monitoring techniques to conserve power.

At 710, the APD 180 iteratively repeats monitoring for a wakeup signal. To illustrate, if the APD 180 does not detect the wakeup signal, the APD 180 remains in the APD-PS sleep-state and/or continues to (a) periodically monitor for the wakeup signal and (optionally) (b) follow an APD-PS cycle as defined by an APD-PS configuration (e.g., the sub-diagram 660 of FIG. 6).

At 715, and at a later point in time, the base station 120 indicates the APD-PS wakeup signal during a time period in which the APD 180 monitors for a wakeup signal. Accordingly, at 720 and while performing an iteration of monitoring for the wakeup signal as described at 705, the APD 180 detects the APD-PS wakeup signal. In some aspects, the base station 120 indicates, with the APD-PS wakeup signal, a surface configuration for the APD 180 to apply when transitioning to an APD-PS awake-state or when transitioning to a disabled APD-PS mode.

At 725, the APD 180 transitions to a disabled APD-PS mode. However, in alternate aspects, the APD 180 transitions to an APD-PS awake-state (not illustrated) and remains in an enabled APD-PS mode. When transitioning to the disabled APD-PS mode, the APD 180 stops performing APD-PS operations.

At 730, the APD 180 optionally applies a surface configuration to the RIS of the APD. For instance, the APD 180 applies a surface configuration indicated at 715. Alternatively or additionally, the APD 180 applies a default surface configuration or maintains the most recent surface configuration applied to the RIS.

Example Methods for APD Power-Saving Operations

Figure 8:
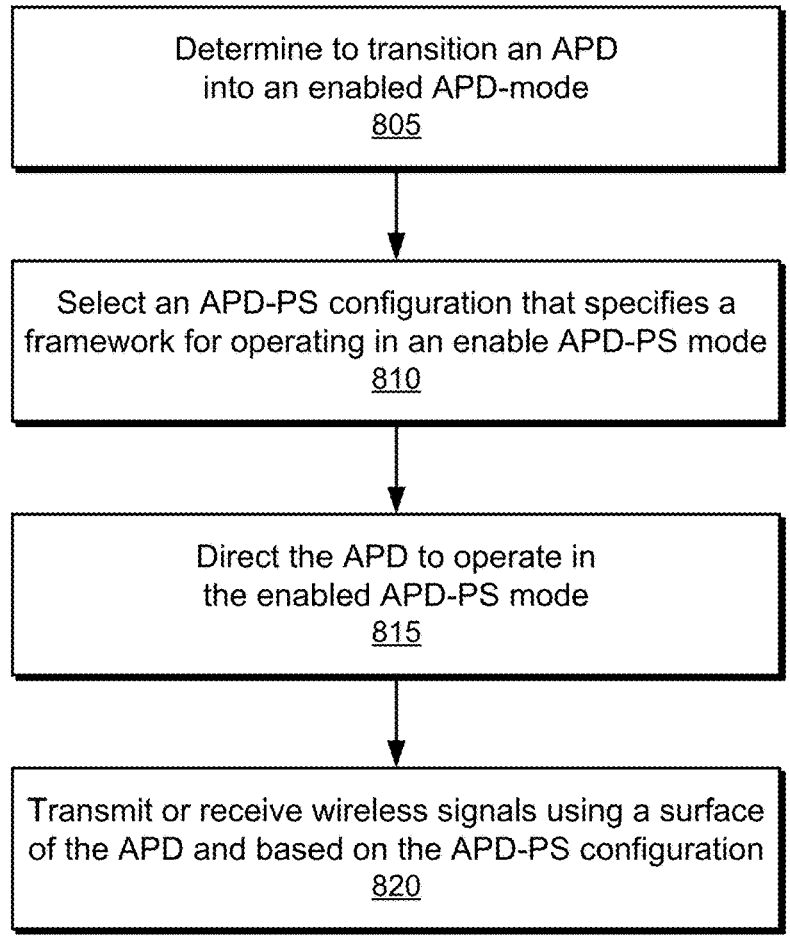
FIG. 8 illustrates an example method in accordance with various aspects of adaptive phase-changing device power-saving operations.

Example methods 800 and 900 are described with reference to FIGS. 8 and 9 in accordance with one or more aspects of APD power-saving operations. FIG. 8 illustrates an example method 800 used to perform aspects of APD power-saving operations performed by a base station, such as the base station 120 of FIG. 1.

At 805, a base station determines to transition an APD into an enabled APD-mode. For instance, the base station 120 detects a low-utilization trigger event as described at 615 of FIG. 6 and determines to transition the APD 180 to the enabled APD-mode.

At 810, the base station selects an APD-PS configuration for the APD that specifies a framework, operating schedule, and/or operating sequence for operating in the enabled APD-mode. The base station 120, as one example, selects the APD-PS configuration based on any combination of SSB transmissions, one or more DRX cycles, and/or PRACH transmission opportunities as described with reference to FIG. 5 and at 620 of FIG. 6. Thus, the framework, operating schedule, and/or operating sequence specifies a combination and/or arrangement of APD-modes and surface configurations as described with reference to FIG. 5.

At 815, the base station directs the APD to operate in the enabled APD-PS mode, such as by communicating the APD-PS configuration to the APD. To illustrate, the base station 120 transmits an APD-PS sleep signal to the APD 180 as described at 625 and/or communicates the APD-PS configuration 510 to the APD 180 as described at 630 of FIG. 6.

At 820, the base station transmits or receives wireless signals using a surface of the APD and based on the APD-PS configuration. For example, the base station 120 transmits SSB blocks, transmits a downlink communication based on a DRX cycle of the UE 111, and/or receives a PRACH transmission from the UE 112 as described at 650 of FIG. 6. In general, the base station transmits or receives wireless signals based on the APD-PS configuration by: transmitting or receiving wireless signals using the surface of the APD when the APD is in an APD-PS awake-state; and/or refraining from transmitting or receiving wireless signals using the surface of the APD when the APD is in an APD-PS sleep-state.

Figure 9:
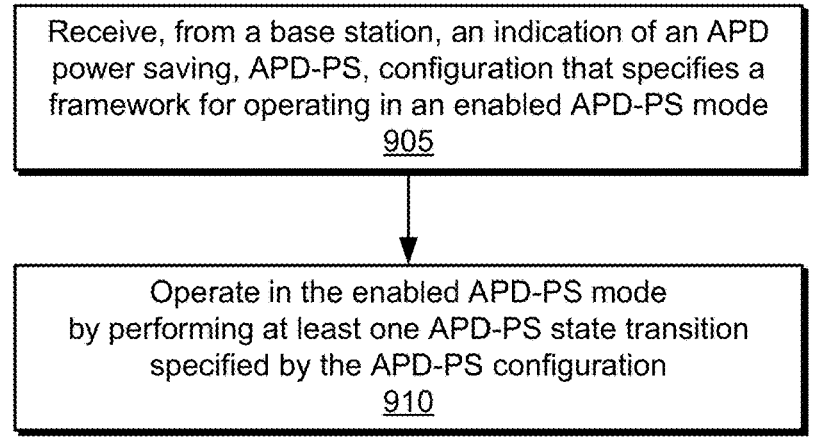
FIG. 9 illustrates an example method in accordance with various aspects of adaptive phase-changing device power-saving operations.

FIG. 9 illustrates an example method 900 used to perform aspects of APD power-saving operations performed by an APD, such as the APD 180 of FIG. 1.

At 905, an APD receives, from a base station, an indication of an APD power-saving, APD-PS, a configuration that specifies a framework for operating in an enabled APD-PS mode. To illustrate, the APD 180 receives the APD-PS configuration 510 from the base station 120 as described at 630 of FIG. 6.

At 910, the APD operates the enabled APD-PS mode by performing at least one APD-PS state transition specified by the APD-PS configuration. The APD 180, for example, transitions to an APD-PS sleep-state as described at 635 of FIG. 6. The APD 180 may also transition to an APD-PS awake-state as described at 640 of FIG. 6 and optionally apply a surface configuration as described at 645. In aspects, the APD 180 iteratively transitions between APD-PS states based on the APD-PS configuration 510.

The order in which the method blocks of the methods 800 and 900 are described is not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or additionally, any of the functionality described herein can be performed, at least in part, by one or more hardware logic components, such as, and without limitation, Field-Programmable Gate Arrays (FPGAs), Application-Specific Integrated Circuits (ASICs), Application-Specific Standard Products (ASSPs), System-on-Chip systems (SoCs), Complex Programmable Logic Devices (CPLDs), and the like.

Although aspects of adaptive phase-changing device power-saving operations have been described in language specific to features and/or methods, the subject of the appended claims is not necessarily limited to the specific features or methods described. Rather, the specific features and methods are disclosed as example implementations of adaptive phase-changing device power-saving operations, and other equivalent features and methods are intended to be within the scope of the appended claims. Thus, the appended claims include a list of features that can be selected in "any combination thereof," which includes combining any number and any combination of the listed features. Further, various different aspects are described, and it is to be appreciated that each described aspect can be implemented independently or in connection with one or more other described aspects.

In the following, several examples are described:

Example 1: A method performed by a base station for using an adaptive phase-changing device, APD, in a wireless network based on an APD power saving, APD-PS, configuration of the APD, the method comprising: determining to transition an APD into an enabled APD-PS mode; selecting the APD-PS configuration for the APD that specifies a framework for operating in the enabled APD-PS mode; directing the APD to operate in the enabled APD-PS mode by communicating the APD-PS configuration to the APD; and transmitting or receiving wireless signals using a surface of the APD and based on the APD-PS configuration.

Example 2: The method as recited in example 1, wherein determining the APD-PS configuration further comprises determining, as the framework for operating in the enabled APD-PS mode at least one of: an APD-PS cycle configuration; one or more APD-PS state-transitions; or an APD-surface-configuration sequence.

Example 3: The method as recited in example 2, wherein the APD-surface-configuration sequence includes multiple surface-configurations, the method further comprising: directing the APD to apply the multiple surface-configurations in succession to the surface while the APD operates in an APD-PS awake-state.

Example 4: The method as recited in example 2 or example 3, wherein determining the APD-PS configuration further comprises: determining to configure the APD-PS cycle configuration as a long APD-PS cycle.

Example 5: The method as recited in example 4, wherein the long APD-PS cycle spans a first time-duration, and wherein determining the long APD-PS cycle further comprises: configuring the long APD-PS cycle with multiple short APD-PS cycles, each short APD-PS cycle associated with a respective user equipment, UE, of multiple user equipments, UEs and spanning a respective time-duration that is shorter than the first time-duration.

Example 6: The method as recited in example 5, wherein determining the APD-PS configuration further comprises: including, in the APD-surface-configuration sequence, a respective surface configuration for the surface of the APD to service the respective UE of the multiple user equipments, UEs; and including, in the APD-surface-configuration sequence, timing information that directs the APD to apply the respective surface configuration to the surface of the APD during a respective short APD-PS cycle of the multiple short APD-PS cycles that is associated with the respective UE.

Example 7: The method as recited in example 5 or example 6, wherein configuring the long APD-PS cycle with multiple short APD-PS cycles further comprises: determining a respective discontinuous reception, DRX, cycle for the respective UE; and aligning, in the APD-PS configuration, the respective short APD-PS cycle to the respective DRX cycle of the respective UE.

Example 8: The method as recited in any one of examples 1 to 7 the method further comprising: transmitting APD-control information to the APD while the APD operates in an APD-PS awake-state.

Example 9: The method as recited in example 8, wherein transmitting the APD-control information further comprises: transmitting directions to update a surface configuration applied to the surface.

Example 10: The method as recited in any one of examples 1 to 9, wherein transmitting or receiving the wireless signals further comprises: transmitting or receiving the wireless signals towards the surface of the APD while the APD operates in an APD-PS sleep-state.

Example 11: The method as recited in any one of examples 1 to 10 further comprising: transmitting a wakeup signal to the APD that directs the APD to immediately transition to an APD-PS awake-state; or transmitting a sleep signal to the APD that directs the APD to immediately transition to an APD-PS sleep-state.

Example 12: The method as recited in example 11, further comprising: transmitting the wakeup signal with an indication of an updated surface configuration; and directing the APD to apply the updated surface configuration to the surface upon transitioning to the APD-PS awake-state.

Example 13: The method as recited in any one of examples 1 to 12, wherein determining the APD-PS configuration for the APD further comprises at least one of: determining the APD-PS configuration for the APD based on synchronization signal block (SSB) transmissions of the base station; determining the APD-PS configuration for the APD based on a physical random access channel, PRACH, transmission opportunity; or determining the APD-PS configuration for the APD based on an integrated access backhaul, IAB, transmission opportunity.

Example 14: The method as recited in any one of examples 1 to 13, wherein determining to transition an APD into the enabled APD-PS mode further comprises at least one of: identifying that a number of transmissions in the wireless network falls below a threshold value; determining to transition one or more connected user equipments, UEs, to an enabled DRX mode; or identifying, from historical records, that the wireless network statistically operates in a low-utilization mode during a current time-period.

Example 15: A method performed by an adaptive phase-changing device, APD, for configuring a surface of the APD, the method comprising: receiving, from a base station, an indication of an APD power saving, APD-PS, configuration that specifies a framework for operating in an enabled APD-PS mode; and operating in the enabled APD-PS mode by performing at least one APD-PS state transition specified by the APD-PS configuration.

Example 16: The method as recited in example 15, wherein receiving the indication of the APD-PS configuration further comprises: receiving at least one of: an APD-PS cycle configuration; one or more APD-PS state-transitions; or an APD-surface-configuration sequence.

Example 17: The method as recited in example 16, wherein receiving the indication of the APD-PS configuration further comprises: receiving, as the APD-surface-configuration sequence, multiple surface-configurations, and wherein the method further comprises: applying the multiple surface-configurations to the surface in succession and while operating in an APD-PS awake-state.

Example 18: The method as recited example 16 or example 17, wherein receiving the indication of the APD-PS configuration further comprises: receiving, as the APD-PS configuration, a long APD-PS cycle, and wherein configuring the APD-PS mode further comprises: configuring the APD-PS mode to operate using the long APD-PS cycle.

Example 19: The method as recited in example 18, where receiving the long APD-PS cycle further comprises: receiving, as the long APD-PS cycle, multiple short APD-PS cycles.

Example 20: The method as recited in example 19, wherein receiving the indication of the APD-PS configuration further comprises: receiving the APD-surface-configuration sequence, wherein the APD-surface-configuration sequence includes multiple surface-configurations; and receiving timing information that directs the APD to apply a respective surface configuration of the multiple surface-configurations to the surface of the APD during a respective short APD-PS cycle of the multiple short APD-PS cycles.

Example 21: The method as recited in any one of examples 15 to 20, wherein receiving the indication of the APD-PS configuration further comprises: receiving directions to operate in a full APD-PS sleep-state or a partial APD-PS sleep-state.

Example 22: The method as recited in any one of examples 15 to 21, receiving, while operating in an APD-PS awake-state, APD-control information on an adaptive phase-changing device-control channel, APD-control channel; and decoding, while operating in the APD-PS awake-state, the APD-control information.

Example 23: The method as recited in example 22, wherein receiving the APD-control information further comprises: receiving directions to update a surface configuration.

Example 24: The method as recited in any one of examples 15 to 23, further comprising: receiving, from the base station, a wakeup signal; and transitioning to a disabled APD-PS mode or an APD-PS awake-state.

Example 25: The method as recited in example 24, further comprising: receiving, with the wakeup signal, an indication of an updated surface configuration; and in response to transitioning to the APD-PS awake-state, applying the updated surface configuration to the surface.

Example 26: The method as recited in any one of examples 15 to 25, further comprising: receiving, from the base station, a sleep signal; and transitioning to an APD-PS sleep-state.

Example 27: A base station comprising: a processor; and computer-readable storage media comprising instructions, responsive to execution by the processor, for directing the base station to perform a method as recited in any one of examples 1 to 14.

Example 28: An adaptive phase-changing device, APD, comprising: a reconfigurable intelligent surface, RIS; at least one wireless transceiver; a processor; and computer-readable storage media comprising instructions, responsive to execution by the processor, for directing the APD to perform any one of the methods recited in examples 15 to 26.

Example 29: A computer-readable storage media comprising instructions that, responsive to execution by a processor, direct the processor to perform a method as recited in any one of examples 1 to 26.

What is claimed is:

1. A method performed by a base station for using an adaptive phase-changing device (APD) in a wireless network based on an APD power saving configuration (APD-PS configuration of the APD), the method comprising:
    selecting an APD-PS configuration for the APD that specifies a framework for operating in an enabled APD-PS mode;
    directing the APD to operate in the enabled APD-PS mode by communicating the APD-PS configuration to the APD; and
    transmitting or receiving wireless signals using a surface of the APD and based on the APD-PS configuration.

2. The method as recited in claim 1, wherein selecting the APD-PS configuration further comprises selecting, as the framework for operating in the enabled APD-PS mode, at least one of:
    an APD-PS cycle configuration;
    one or more APD-PS state-transitions; or
    an APD-surface-configuration sequence.

3. The method as recited in claim 2, wherein the APD-surface-configuration sequence includes multiple surface-configurations, the method further comprising:
    directing the APD to apply the multiple surface-configurations in succession to the surface while the APD operates in an APD-PS awake-state.

4. The method as recited in claim 1, wherein selecting the APD-PS configuration further comprises:
    configuring a long APD-PS cycle that spans a first time-duration with multiple short APD-PS cycles, each short APD-PS cycle associated with a respective user equipment (UE) of multiple user equipments (UEs) and spanning a respective time-duration that is shorter than the first time-duration.

5. The method as recited in claim 4, wherein configuring the long APD-PS cycle with the multiple short APD-PS cycles further comprises:
    aligning, in the APD-PS configuration, the respective short APD-PS cycle to a respective discontinuous reception (DRX) cycle of the respective UE.

6. The method as recited in claim 1, wherein transmitting or receiving the wireless signals further comprises:
    transmitting or receiving the wireless signals towards the surface of the APD while the APD operates in an APD-PS sleep-state.

7. The method as recited in claim 1, further comprising:
    transmitting a wakeup signal to the APD that directs the APD to immediately transition to an APD-PS awake-state; or
    transmitting a sleep signal to the APD that directs the APD to immediately transition to an APD-PS sleep-state.

8. The method as recited in claim 1, wherein selecting the APD-PS configuration for the APD further comprises at least one of:
    selecting the APD-PS configuration for the APD based on synchronization signal block (SSB) transmissions of the base station;
    selecting the APD-PS configuration for the APD based on a physical random access channel (PRACH) transmission opportunity; or
    selecting the APD-PS configuration for the APD based on an integrated access backhaul (IAB) transmission opportunity.

9. The method as recited in claim 1, further comprising:
    detecting a low-utilization trigger event, wherein the selecting the APD-PS configuration for the APD that specifies the framework for operating in the enabled APD-PS mode is based on the detecting the low-utilization trigger event.

10. The method as recited in claim 9, wherein the low-utilization trigger event comprises at least one of:
    identifying that a number of transmissions in the wireless network falls below a threshold value;
    identifying that one or more user equipments (UEs) connected to the base station currently operate in a DRX mode; or
    identifying, from historical records, that the wireless network statistically operates in a low-utilization mode during a current time-period.

11. The method as recited in claim 1, further comprising:
    communicating with a user equipment (UE) using the surface of the APD before the selecting of the APD-PS configuration for the APD that specifies the framework for operating in the enabled APD-PS mode.

12. A base station comprising:
    a processor; and
    computer-readable storage media comprising instructions, executable by the processor, to configure the base station to:
        select an APD-PS configuration for the APD that specifies a framework for operating in an enabled APD-PS mode;
        direct the APD to operate in the enabled APD-PS mode by communicating the APD-PS configuration to the APD; and
        transmit or receive wireless signals using a surface of the APD and based on the APD-PS configuration.

13. The base station of claim 12, wherein the instructions for the selection of the APD-PS configuration are further executable to configure the base station to select, as the framework for operating in the enabled APD-PS mode, at least one of:
    an APD-PS cycle configuration;
    one or more APD-PS state-transitions; or
    an APD-surface-configuration sequence.

14. The base station of claim 13, wherein the APD-surface-configuration sequence includes multiple surface-configurations, the instructions further executable to configure the base station to:
    direct the APD to apply the multiple surface-configurations in succession to the surface while the APD operates in an APD-PS awake-state.

15. The base station of claim 12, wherein the instructions for the selection of the APD-PS configuration are further executable to configure the base station to:
    configure a long APD-PS cycle that spans a first time-duration with multiple short APD-PS cycles, each short APD-PS cycle associated with a respective user equipment (UE) of multiple user equipments (UEs) and spanning a respective time-duration that is shorter than the first time-duration,
    wherein the instructions for the configuration of the long APD-PS cycle with the multiple short APD-PS cycles are further executable to configure the base station to:
    align, in the APD-PS configuration, the respective short APD-PS cycle to a respective discontinuous reception (DRX) cycle of the respective UE.

16. The base station of claim 12, wherein the instructions for the transmission or reception of the wireless signals are further executable to configure the base station to:
    transmit or receive the wireless signals towards the surface of the APD while the APD operates in an APD-PS sleep-state.

17. The base station of claim 12, wherein the instructions are further executable to configure the base station to:
    transmit a wakeup signal to the APD that directs the APD to immediately transition to an APD-PS awake-state; or
    transmit a sleep signal to the APD that directs the APD to immediately transition to an APD-PS sleep-state.

18. The base station of claim 12, wherein the instructions for the selection of the APD-PS configuration are further executable to configure the base station to:
    select the APD-PS configuration for the APD based on synchronization signal block (SSB) transmissions of the base station;
    select the APD-PS configuration for the APD based on a physical random access channel (PRACH) transmission opportunity; or
    select the APD-PS configuration for the APD based on an integrated access backhaul (IAB) transmission opportunity.

19. The base station of claim 12, wherein the instructions are further executable to configure the base station to:
    detect a low-utilization trigger event, wherein the selection of the APD-PS configuration for the APD that specifies the framework for operating in the enabled APD-PS mode is based on the detection of the low-utilization trigger event.

20. The base station of claim 12, wherein the instructions are further executable to configure the base station to:
    communicate with a user equipment (UE) using the surface of the APD before the selection of the APD-PS configuration for the APD that specifies the framework for operating in the enabled APD-PS mode.

* * * * *